(12) United States Patent
Huffman et al.

(10) Patent No.: US 11,538,485 B2
(45) Date of Patent: *Dec. 27, 2022

(54) GENERATION AND DETECTION OF WATERMARK FOR REAL-TIME VOICE CONVERSION

(71) Applicant: Modulate, Inc., Cambridge, MA (US)

(72) Inventors: William Carter Huffman, Cambridge, MA (US); Brendan Kelly, Somerville, MA (US)

(73) Assignee: Modulate, Inc., Cambridge, MA (US)

(*) Notice: Subject to any disclaimer, the term of this patent is extended or adjusted under 35 U.S.C. 154(b) by 60 days.

This patent is subject to a terminal disclaimer.

(21) Appl. No.: 16/994,432

(22) Filed: Aug. 14, 2020

(65) Prior Publication Data

US 2021/0050025 A1   Feb. 18, 2021

Related U.S. Application Data

(60) Provisional application No. 62/886,598, filed on Aug. 14, 2019.

(51) Int. Cl.
*G10L 19/018* (2013.01)
*G06N 3/04* (2006.01)
(Continued)

(52) U.S. Cl.
CPC ............................. *G10L 19/018* (2013.01)

(58) Field of Classification Search
CPC .............. G10L 19/018; G10L 21/007; G10L 2021/0135; G10L 25/30; G06N 3/0454; G06N 3/088

See application file for complete search history.

(56) References Cited

U.S. PATENT DOCUMENTS 5,327,521 A   7/1994   Savic et al.
5,677,989 A   10/1997  Rabin et al.
(Continued)

FOREIGN PATENT DOCUMENTS

CN   107293289 A   10/2017
KR   101665882 B1  10/2016
(Continued)

OTHER PUBLICATIONS

Anderson F Machado et al: "Voice Conversion: A Critical SURVEYe/pjp", Jan. 1, 2010, Jan. 1, 2010 (Jan. 1, 2010), pp. 1-8, XP007921050, Retrieved from the Internet: URL:www.ime.usp.br/-mqz/SMC2010Voice.pdf.

(Continued)

*Primary Examiner* — Michael N Opsasnick
(74) *Attorney, Agent, or Firm* — Nutter McClennen & Fish LLP

(57) ABSTRACT

A method watermarks speech data by using a generator to generate speech data including a watermark. The generator is trained to generate the speech data including the watermark. The training process generates first speech from the generator. The first speech data is configured to represent speech. The first speech data includes a candidate watermark. The training also produces an inconsistency message as a function of at least one difference between the first speech data and at least authentic speech data. The training further includes transforming the first speech data, including the candidate watermark, using a watermark robustness module to produce transformed speech data including a transformed candidate watermark. The transformed speech data includes a transformed candidate watermark. The training further produces a watermark-detectability message, using a watermark detection machine learning system, relat- (Continued)

ing to one or more desirable watermark features of the transformed candidate watermark.

20 Claims, 7 Drawing Sheets

(51) Int. Cl.
*G06N 3/08* (2006.01)
*G10L 21/007* (2013.01)
*G10L 21/013* (2013.01)
*G10L 25/30* (2013.01)

(56) References Cited

U.S. PATENT DOCUMENTS

| | | | |
|---|---|---|---|
| 5,704,006 | A | 12/1997 | Iwahashi |
| 5,758,023 | A | 5/1998 | Bordeaux |
| 5,808,222 | A | 9/1998 | Yang |
| 6,161,091 | A | 12/2000 | Akamine et al. |
| 6,307,140 | B1 | 10/2001 | Iwamoto |
| 7,117,154 | B2 | 10/2006 | Yoshioka et al. |
| 7,412,377 | B2 | 8/2008 | Monkowski |
| 7,565,697 | B2 * | 7/2009 | LeVine .............. G06F 21/10 713/193 |
| 7,590,532 | B2 | 9/2009 | Suzuki et al. |
| 7,634,410 | B2 | 12/2009 | Lemoine et al. |
| 7,664,645 | B2 | 2/2010 | Hain et al. |
| 7,987,244 | B1 | 7/2011 | Lewis et al. |
| 8,060,565 | B1 | 11/2011 | Swartz |
| 8,131,550 | B2 | 3/2012 | Nurminen et al. |
| 8,930,183 | B2 | 1/2015 | Chun et al. |
| 9,009,052 | B2 | 4/2015 | Nakano et al. |
| 9,135,923 | B1 | 9/2015 | Chen |
| 9,153,235 | B2 | 10/2015 | Zhang et al. |
| 9,183,830 | B2 | 11/2015 | Agiomyrgiannakis |
| 9,305,530 | B1 | 4/2016 | Durham et al. |
| 9,532,136 | B2 | 12/2016 | Uhle et al. |
| 9,589,574 | B1 | 3/2017 | Klimanis et al. |
| 9,800,721 | B2 | 10/2017 | Gainsboro et al. |
| 10,186,251 | B1 | 1/2019 | Mohammadi |
| 10,361,673 | B1 | 7/2019 | Matsukawa |
| 10,453,476 | B1 | 10/2019 | Aryal |
| 10,614,826 | B2 * | 4/2020 | Huffman .............. G10L 15/063 |
| 10,622,002 | B2 | 4/2020 | Huffman et al. |
| 10,708,687 | B1 | 7/2020 | Gedney et al. |
| 10,861,476 | B2 | 12/2020 | Huffman et al. |
| 2001/0044721 | A1 | 11/2001 | Yoshioka et al. |
| 2002/0072900 | A1 | 6/2002 | Keough et al. |
| 2002/0086653 | A1 | 7/2002 | Kim |
| 2002/0120854 | A1 * | 8/2002 | LeVine .............. G06F 21/10 713/189 |
| 2003/0158734 | A1 | 8/2003 | Cruickshank |
| 2005/0064374 | A1 | 3/2005 | Spector |
| 2005/0131680 | A1 | 6/2005 | Chazan et al. |
| 2006/0210956 | A1 | 9/2006 | Okamoto |
| 2006/0268007 | A1 | 11/2006 | Gopalakrishnan |
| 2008/0034231 | A1 * | 2/2008 | Ginter .............. H04N 21/26613 714/E11.207 |
| 2008/0082320 | A1 | 4/2008 | Popa et al. |
| 2008/0201150 | A1 | 8/2008 | Tamura et al. |
| 2008/0243511 | A1 | 10/2008 | Fujita et al. |
| 2008/0262838 | A1 | 10/2008 | Nurminen et al. |
| 2008/0269633 | A1 | 10/2008 | Watson |
| 2009/0034704 | A1 | 2/2009 | Ashbrook et al. |
| 2009/0089063 | A1 | 4/2009 | Meng et al. |
| 2009/0094027 | A1 | 4/2009 | Nurminen et al. |
| 2009/0177473 | A1 | 7/2009 | Aaron et al. |
| 2010/0049522 | A1 | 2/2010 | Tamura et al. |
| 2010/0082326 | A1 | 4/2010 | Bangalore et al. |
| 2010/0088089 | A1 | 4/2010 | Hardwick |
| 2010/0094620 | A1 | 4/2010 | Hardwick |
| 2010/0198600 | A1 | 8/2010 | Masuda |
| 2010/0215289 | A1 | 8/2010 | Pradeep et al. |
| 2011/0098029 | A1 | 4/2011 | Rhoads et al. |
| 2011/0125493 | A1 | 5/2011 | Hirose et al. |
| 2011/0161348 | A1 | 6/2011 | Oron |
| 2011/0218804 | A1 | 9/2011 | Chun |
| 2012/0095762 | A1 | 4/2012 | Eom et al. |
| 2012/0116756 | A1 | 5/2012 | Kalinli |
| 2012/0166187 | A1 | 6/2012 | Van Buskirk et al. |
| 2012/0253794 | A1 | 10/2012 | Chun et al. |
| 2012/0253812 | A1 | 10/2012 | Kalinli et al. |
| 2013/0025437 | A1 | 1/2013 | Serletic et al. |
| 2013/0150117 | A1 | 6/2013 | Rodriguez et al. |
| 2013/0151256 | A1 | 6/2013 | Nakano et al. |
| 2013/0203027 | A1 | 8/2013 | De Villers-Sidani et al. |
| 2013/0311189 | A1 | 11/2013 | Villavicencio et al. |
| 2014/0046660 | A1 | 2/2014 | Kamdar |
| 2014/0088958 | A1 | 3/2014 | Chen |
| 2014/0114655 | A1 | 4/2014 | Kalinli-Akbacak |
| 2014/0122081 | A1 | 5/2014 | Kaszczuk et al. |
| 2014/0149112 | A1 | 5/2014 | Kalinli-Akbacak |
| 2014/0180673 | A1 | 6/2014 | Neuhauser et al. |
| 2014/0180675 | A1 | 6/2014 | Neuhauser et al. |
| 2014/0195242 | A1 | 7/2014 | Chen |
| 2014/0200889 | A1 | 7/2014 | Chen |
| 2015/0005661 | A1 | 1/2015 | Trammell |
| 2015/0025892 | A1 | 1/2015 | Lee et al. |
| 2015/0052594 | A1 * | 2/2015 | Liberman .............. H04L 63/08 726/6 |
| 2015/0063573 | A1 | 3/2015 | Daly |
| 2015/0127350 | A1 | 5/2015 | Agiomyrgiannakis |
| 2015/0161753 | A1 | 6/2015 | Blesser |
| 2015/0255074 | A1 | 9/2015 | Jeong et al. |
| 2015/0279349 | A1 | 10/2015 | Byron et al. |
| 2015/0356967 | A1 | 12/2015 | Byron et al. |
| 2015/0379752 | A1 | 12/2015 | Li et al. |
| 2016/0005403 | A1 | 1/2016 | Agiomyrgiannakis et al. |
| 2016/0036961 | A1 | 2/2016 | Lee |
| 2016/0111108 | A1 | 4/2016 | Erdogan et al. |
| 2016/0196630 | A1 | 7/2016 | Blesser |
| 2016/0260425 | A1 | 9/2016 | Saino et al. |
| 2016/0300582 | A1 | 10/2016 | Vaillancourt et al. |
| 2016/0378427 | A1 | 12/2016 | Sharma et al. |
| 2016/0379641 | A1 | 12/2016 | Liu et al. |
| 2017/0142548 | A1 | 5/2017 | Buskirk et al. |
| 2017/0149961 | A1 | 5/2017 | Kim et al. |
| 2018/0040324 | A1 | 2/2018 | Wilberding |
| 2018/0053261 | A1 | 2/2018 | Hershey |
| 2018/0097841 | A1 | 4/2018 | Stolarz et al. |
| 2018/0108370 | A1 | 4/2018 | Dow et al. |
| 2018/0137875 | A1 | 5/2018 | Liu et al. |
| 2018/0146370 | A1 | 5/2018 | Krishnaswamy et al. |
| 2018/0182397 | A1 | 6/2018 | Carbune et al. |
| 2018/0225083 | A1 | 8/2018 | Barkley et al. |
| 2018/0276710 | A1 | 9/2018 | Tietzen et al. |
| 2018/0277113 | A1 | 9/2018 | Hartung et al. |
| 2018/0336713 | A1 | 11/2018 | Avendano et al. |
| 2018/0342256 | A1 * | 11/2018 | Huffman .............. G10L 13/033 |
| 2018/0342257 | A1 * | 11/2018 | Huffman .............. G10L 15/063 |
| 2018/0342258 | A1 * | 11/2018 | Huffman .............. G10L 15/02 |
| 2019/0051276 | A1 | 2/2019 | Lathrop et al. |
| 2020/0243101 | A1 | 7/2020 | Huffman et al. |
| 2021/0050025 | A1 * | 2/2021 | Huffman .............. G10L 25/30 |
| 2021/0256985 | A1 | 8/2021 | Huffman et al. |
| 2022/0115033 | A1 | 4/2022 | Huffman et al. |

FOREIGN PATENT DOCUMENTS

| | | |
|---|---|---|
| KR | 101666930 B1 | 10/2016 |
| WO | 2018218081 A1 | 11/2018 |

OTHER PUBLICATIONS

Arik et al.—"Neural Voice Cloning with a Few Samples," arXiv:1802.06006 [cs.CL], 17 pages, Mar. 20, 2018.
Arjovsky et al.—"Wasserstein GAN," arXiv:1701.07875 [stat.ML], 32 pages, Dec. 6, 2017.
De Brébisson et al.—"Create a digital copy of your voice with one minute of audio," Lyrebird, https://lyrebird.ai, 1 page showing URL provided, 2017.

(56) References Cited

OTHER PUBLICATIONS

Desai, S., et al., "Spectral Mapping Using Artificial Neural Networks for Voice Conversion," IEEE Transactions on Audio, Speech, and Language Processing, vol. 18, No. 5, Jul. 2010, pp. 954-964.
Extended European Search Report issued by the European Patent Office for corresponding European Patent Application No. 18806567.6, dated Jan. 21, 2022.
Goodfellow et al.—"Generative Adversarial Nets," arXiv:1406.2661 [stat.ML], 9 pages, Jun. 10, 2014.
Gulrajani et al.—"Improved Training of Wasserstein GANs," arXiv:1704.00028 [cs.LG], 20 pages, Dec. 25, 2017.
Hong—"RNN GAN Based General Voice Conversion-Pitch," Youtube, Retrieved from https://www.youtube.com/watch?v=ULWLIeBDCEY, 1 page showing URL provided, Jan. 12, 2018.
Hsu et al.—"Voice Conversion from Unaligned Corpora using Variational Autoencoding Wasserstein Generative Adversarial Networks," arXiv:1704.00849 [cs.CL], 5 pages, Jun. 8, 2017.
International Search Report, dated Sep. 25, 2018, US Patent Office, International Patent Application PCT/US2018/034485, together with the Written Opinion of the International Searching Authority, 21 pages.
International Searching Authority, International Search Report—International Application No. PCT/US2021/054319, dated Feb. 14, 2022, together with the Written Opinion of the International Searching Authority, 14 pages.
Kaneko et al.—"Parallel-Data-Free Voice Conversion Using Cycle-Consistent Adversarial Networks," arXiv:1711.11293 [stat.ML], 5 pages, Dec. 20, 2017.
Kaneko et al.—"Sequence-to-Sequence Voice Conversion with Similarity Metric Learned Using Generative Adversarial Networks," INTERSPEECH 2017, pp. 1283-1287, Aug. 2017.
Lorenzo-Trueba et al.—"Can we steal your vocal identity from the Internet?: Initial investigation of cloning Obama's voice using GAN, WaveNet and low-quality found data," arXiv:1803.00860 [eess.AS], 8 pages, Mar. 2, 2018.
Machado, A., et al. "Voice Conversion: A Critical Survey," retrieved from https://www.ime.usp.br/~mqz/SMC2010_Voice.pdf, pp. 291-298, published in 2010.
Ming Huaiping et al: "Exemplar-based sparse representation of timbre and prosody for voice conversion", 2016 IEEE International Conference on Acoustics, Speech and Signal Processing (ICASSP), IEEE, Mar. 20, 2016 (Mar. 20, 2016), pp. 5175-5179, XP032901590, DOI: 10.1109/ICASSP.2016.7472664 [retrieved on May 18, 2016] *D2, p. 1, left col. lines 6-9 of the introduction *.
Mobin et al.—"Voice Conversion using Convolutional Neural Networks," 2016 Machine Learning Summer School, Abstract, 6 pages (Sep. 2018).
Nachmani et al.—"Fitting New Speakers Based on a Short Untranscribed Sample," arXiv:1802.06984 [cs.LG], 9 pages, Feb. 20, 2018.
Oyamada et al.—"Non-native speech conversion with consistency-aware recursive network and generative adversarial network," Proceedings of APSIPA Annual Summit and Conference, 7 pages, Dec. 2017.
Sallmans et al.—"Improved Techniques for Training GANs," arXiv:1606.03498 [cs.LG], 10 pages, Jun. 10, 2016.
Srinivas Desai et al: "Spectral Mapping Using Artificial Neural Networks for Voice Conversion", IEEE Transactions on Audio, Speech and Language Processing, IEEE, US, vol. 18, No. 5, Jul. 1, 2010 (Jul. 1, 2010), pp. 954-964, XP011329177, ISSN: 1558-7916, DOI: 10.1109/TASL.2010.2047683 *Section II-A, II-B* *abstract*.
Arora et al., "Real-Time Adaptive Speech Watermarking Scheme for Mobile Applications", Dec. 18, 2003, retrieved on [Nov. 25, 2020], Retrieved from the internet ?URL:https://ieexplore.ieee.org/stamp/stamp.isp?tp=&arumber=1292641? 5 pages.
International Searching Authority, International Search Report—International Application No. PCT/US2020/046534, dated Jan. 5, 2021, together with the Written Opinion of the International Searching Authority, 23 pages.

\* cited by examiner

GENERATION AND DETECTION OF WATERMARK FOR REAL-TIME VOICE CONVERSION

PRIORITY

This patent application claims priority from provisional U.S. patent application No. 62/886,598, filed Aug. 14, 2019, entitled, "GENERATION AND DETECTION OF WATERMARK FOR REAL-TIME VOICE CONVERSION," and naming William C. Huffman and Brendan Kelly as inventors, the disclosure of which is incorporated herein, in its entirety, by reference.

FIELD OF THE INVENTION

Illustrative embodiments of the invention generally relate to voice conversion and, more particularly, the illustrative embodiments of the invention relate to training a system to watermark synthetic voices.

BACKGROUND OF THE INVENTION

Interest in voice technology has recently peaked because of the use of personal voice-activated assistants, such as Amazon Alexa, Siri by Apple, and Google Assistant. Furthermore, podcasts and audiobook services have also recently been popularized.

SUMMARY OF VARIOUS EMBODIMENTS

In accordance with one embodiment of the invention, a method watermarks speech data. The method includes generating, using a generator, speech data including a watermark. The generator is trained to produce speech data including the watermark. The training generates first speech data and/or second speech data from the generator. The first speech data and the second speech data are each configured to represent speech. The first speech data and the second speech data each include a candidate watermark. The training also produces an inconsistency message as a function of at least one difference between the first speech data and at least authentic speech data. The training further includes transforming the first speech data and/or the second speech data, including the candidate watermark, using a watermark robustness module to produce transformed speech data including a transformed candidate watermark. The transformed speech data includes a transformed candidate watermark. The training further produces a watermark-detectability message, using a watermark detection machine learning system, relating to one or more desirable watermark features of the transformed candidate watermark.

In some embodiments, the authentic speech data represents a particular target speaker. Additionally, the authentic speech data may represent a particular target speaker relative to a plurality of different speakers. Furthermore, the authentic speech data may represent human speech generally. The target speaker may be, for example, a celebrity, or a video game character. However, in various embodiments, the target does is non-humanoid speech.

Among other things, the training may include generating second speech data configured to represent speech as a function of the inconsistency message and the watermark-detectability message. The training may further include transforming the second speech data using the watermark robustness module to produce transformed second speech data. The training may additionally produce a second watermark-detectability message, using the watermark detection machine learning system. The second watermark-detectability relates to one or more desirable watermark features of the transformed candidate watermark.

Furthermore, the steps of: generating speech data, transforming the speech data using the watermark robustness module to produce transformed speech data, and producing the watermark-detectability message, may be repeated. These steps may be repeated to produce a robust watermark. The robust watermark is configured such that it is embedded in the speech data to produce watermarked speech data. The watermarked speech data is configured to represent authentic speech and to include a detectable robust watermark when transformed by the watermark robustness module.

Among other ways, the watermark robustness module may transform the speech data by performing a mathematical operation with data representing a background sound. Additionally, or alternatively, the data may represent passing the audio through a microphone. The training may transform the updated speech data to produce an updated transformed candidate watermark using a plurality of various different transformations.

In various embodiments, the inconsistency message may be produced by a discriminative neural network. The first speech data may be generated by a generative neural network. The watermark-detectability message may be generated by a second discriminative neural network, different from the discriminative neural network that generates the inconsistency message.

In various embodiments, the training further includes repeating one or more steps of: generating updated speech data configured to represent human speech as a function of the inconsistency message and the watermark-detectability message, producing an updated inconsistency message relating to at least one difference between the updated speech data and realistic human speech, transforming the updated speech data to produce an updated transformed candidate watermark, detecting the updated transformed candidate watermark using a watermark detection machine learning system, and producing a watermark-detectability message relating to the updated transformed candidate watermark. One or more of these steps may be repeated until (a) the updated speech data cannot be distinguished from authentic speech data by a discriminative neural network, and (b) the updated transformed candidate watermark is detectable.

In accordance with another embodiment, a system includes an adversarial neural network configured to train a generative neural network to generate synthetic speech in a target voice. The system also includes a watermark network configured to train the generative neural network to generate the synthetic speech including a watermark that is detectable by the watermark network. The adversarial neural network is further configured to train the generative neural network to generate the synthetic speech in a target voice. The generated synthetic speech includes the watermark. The generative neural network is configured to generate the synthetic speech including the watermark in the target voice.

The synthetic speech in the target voice including the watermark may not be detectable as synthetic by a discriminative neural network having access to speech data from a plurality of voices mapped in a vector space. In some embodiments, the generative neural network is paired to the watermark network, such that the watermark is configured to be detected by the watermark network that trained the generative neural network.

The system may also include a watermark robustness module configured to transform the speech data to produce transformed speech data. The watermark robustness module may produce an inconsistency message as a function of the transformed speech data.

In accordance with yet another embodiment, a system trains machine learning to produce a speech watermark. The system includes a watermark robustness module configured to (1) receive first speech data that represents realistic speech, the first speech data generated by a generative machine learning system, and (2) transform the first speech data to produce transformed first speech data. The system also includes a watermark machine learning system configured to receive the transformed first speech data and produce a watermark-detectability message. The watermark-detectability message relates to one or more features of the transformed first speech data that are detectable by the watermark machine learning system.

The system may include a generative neural network configured to generate the first speech data that represents human speech. The system may further include a discriminative neural network configured to receive the first speech data and produce an inconsistency message relating to at least one difference between the first speech data and realistic human speech. The system may additionally include a vector space having a plurality of mapped human voices, the plurality of mapped voices being real human speech. Additionally, in some embodiments the watermark machine learning system is configured to embed a watermark in received speech data to produce watermarked speech data. The watermarked speech data represents realistic speech. The watermark machine learning system may also be configured to include a watermark detectable by the watermark machine learning system when the speech data is transformed by the watermark robustness module.

In accordance with yet another embodiment, a method generates speech with a watermark. The method receives speech data representing human speech and having a candidate watermark. The method determines the extent to which the candidate watermark affects the first speech data. The method modifies the candidate watermark when the extent meets prescribed criteria. The method also applies interfering data to the candidate watermark. The method determines whether the candidate watermark is detectable after the interfering data is applied to the candidate watermark. The method modifies the candidate watermark when the candidate watermark is not detectable after the interference is applied.

Among other things, the method may use an adversary to determine the extent to which the candidate watermark affects the first speech data. If the watermark is detectable as not realistic by the adversary, then the adversary will modify it to be not detectable. The interfering data may include a transformation from the watermark robustness module. The method may modify the candidate watermark as a function of a watermark-detectability message. The method may modify the first speech data as a function of an inconsistency message.

In accordance with yet another embodiment, a system for watermarking speech data includes a generator. The generator generates speech data including a watermark. The generator is trained to produce speech data including the watermark. The training includes generating first speech data and/or second speech data from the generator. The first speech data and the second speech data are each configured to represent speech. The first speech data and the second speech data each include a candidate watermark. The training produces an inconsistency message as a function of at least one difference between the first speech data and at least authentic speech data; The training transforms the first speech data and/or the second speech data, including the candidate watermark, using a watermark robustness module to produce transformed speech data including a transformed candidate watermark. The transformed speech data includes a transformed candidate watermark. The method produces a watermark-detectability message, using a watermark detection machine learning system, relating to one or more desirable watermark features of the transformed candidate watermark.

In accordance with another embodiment, a method trains a generator to produce speech data. The method includes using a generator to produce speech data including a watermark. The training includes generating first speech data configured to represent speech. The first speech data includes a candidate watermark. The training produces an inconsistency message as a function of at least one difference between the first speech data and at least authentic speech data. The training transforms the first speech data, including the candidate watermark, using a watermark robustness module to produce transformed speech data including a transformed candidate watermark. The transformed speech data includes a transformed candidate watermark. The training produces a watermark-detectability message, using a watermark detection machine learning system, relating to one or more desirable watermark features of the transformed candidate watermark.

The method may generate second speech data configured to represent realistic human speech as a function of the inconsistency message and the watermark-detectability message. The second speech data may be configured to include a watermark and to represent realistic human speech. The method may further transform the second speech data using the watermark robustness module to produce transformed second speech data. The method may further produce a second watermark-detectability message, using the watermark detection machine learning system. The second watermark-detectability message relates to one or more features of the transformed second speech data that are detectable by the watermark detection machine learning system.

In accordance with yet another embodiment, a voice-conversion system applies a watermark to a converted voice having background noise. The watermark is not detectable by a human, but is detectable by a discriminator. The system may be trained using a watermark net that provides noise profiles during training to build the voice with the watermark.

In accordance with a further embodiment, a method of watermarking a signal with an audio component includes providing a system having a watermark net to receive a watermark. The method provides a noise module having noise profiles. The method also uses the noise module to enable the watermark net to detect the watermark using the noise profiles in the noise module.

In accordance with a further embodiment, a system trains a speech conversion system to generate a watermarked synthetic voice, the system includes source speech data that represents a first speech segment of a source voice. The system further includes target timbre data that relates to a target voice. The system also includes a generative machine learning system configured to produce first candidate speech data that represents a first candidate speech segment in a first candidate voice as a function of the source speech data and the target timbre data. The generative machine learning system is further configured to receive a watermark and noise profiles, and to use the watermark and the noise profiles to generate a watermarked synthetic voice. The system also includes a first discriminative machine learning system configured to compare the first candidate speech data to the target timbre data with reference to timbre data of a plurality of different voices. The discriminative machine learning system is further configured to determine whether there is at least one inconsistency between the first candidate speech data and the target timbre data with reference to the timbre data of the plurality of different voices. When the at least one inconsistency exists, the discriminative neural network produces an inconsistency message having information relating to the inconsistency between the first candidate speech data and the target timbre data, and provides the inconsistency message back to the generative machine learning system. The system also includes a second discriminative machine learning system configured to receive the watermarked synthetic voice. The second discriminative machine learning system is further configured to produce an inconsistency message having information relating to (1) how the watermarked synthetic voice should be altered to increase the likelihood that the detector can hear the watermark in the synthetic voice converted using the noise module, and (2) how the watermarked synthetic voice should be altered to decrease the likelihood that a human listener can detect the watermark in the synthetic voice converted using the noise module. The second discriminative machine learning system provides the inconsistency message back to the generative machine learning system.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, a system is trained to generate speech that includes a watermark. The system trains to generate speech (or data representing speech) that realistically mimics a target voice using an adversarial neural network. The system also trains to embed a watermark in the generated speech, without compromising the quality of the generated speech. The system is trained to embed the watermark in a variety of conditions to withstand potential breaking of the watermark by bad actors. Details of illustrative embodiments are discussed below.

Figure 1:
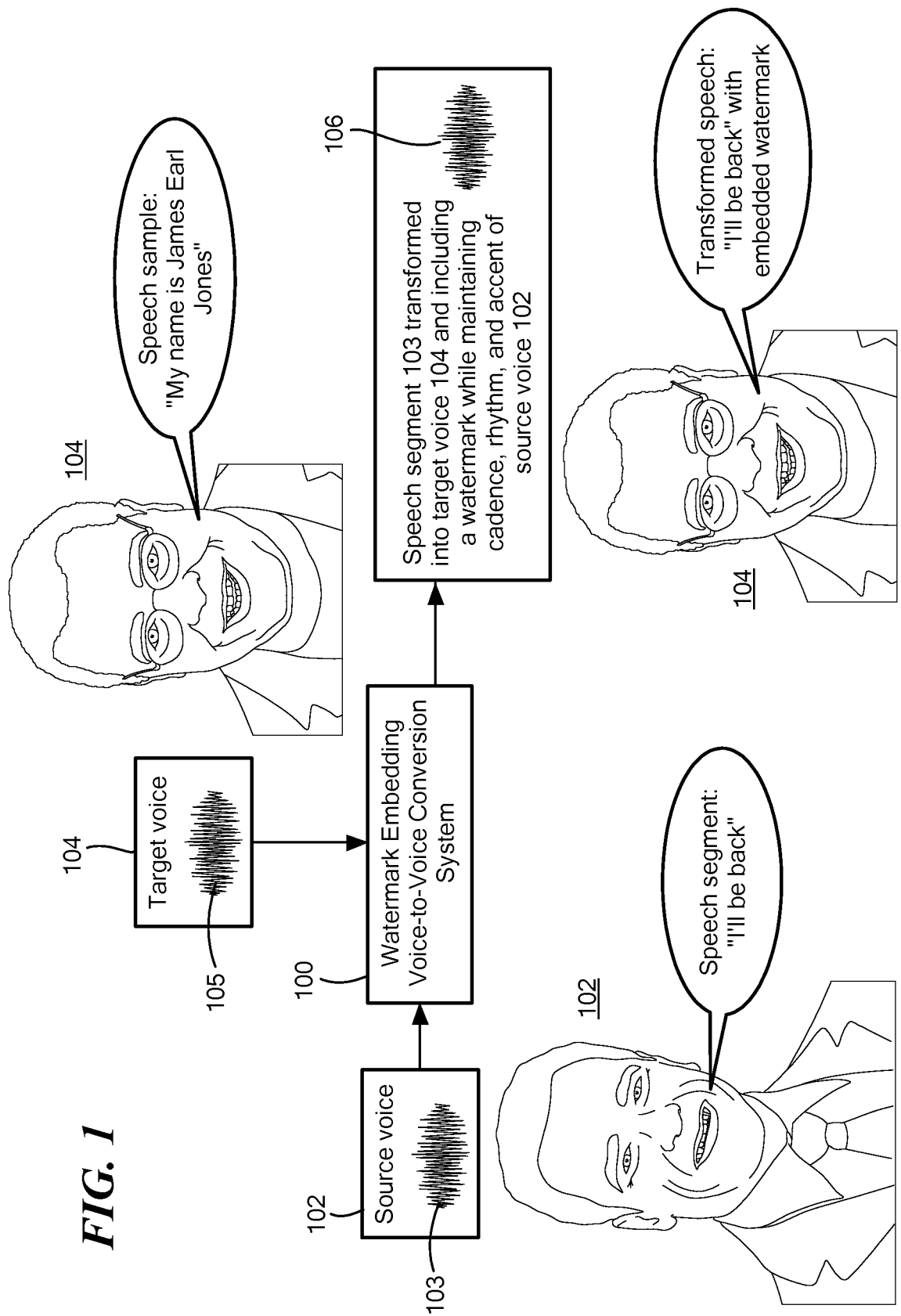
FIG. 1 schematically shows a simplified version of the watermark embedding voice-to-voice conversion system in accordance with illustrative embodiments of the invention.

FIG. 1 schematically shows a simplified version of the watermark embedding voice-to-voice conversion system 100 in accordance with illustrative embodiments of the invention. Among other things, the system 100 allows a user to convert their voice (or any other voice) into a target voice 104 of their choice. More specifically, the system 100 converts the user's speech segment 103 (or speech data) into the target voice 104. The voice providing the speech segment 103 is also referred to as the source. Accordingly, the user's voice in this example is referred to as a source voice 102, because the system 100 converts the speech segment 103, spoken in the source voice 102, into the target voice 104. The result of the conversion is a converted speech segment 106, representing the target voice 104, that includes a watermark. Although the source voice 102 is shown as a human speaker (e.g., Arnold), in some embodiments the source voice 102 may be a synthesized and/or non-humanoid voice.

For ease of discussion, various embodiments refer to converting a voice (e.g., converting from a source voice to a target voice). Although various embodiments refer to converting voices, a person of skill in the art should understand that various embodiments convert the speech data representing the speech segments 103 from one voice (e.g., the source voice 102) to another voice (e.g., the target voice 104). Accordingly, illustrative embodiments are not limited to receiving directly audible audio signals (e.g., an mp3 or direct microphone input). Indeed, discussion of various voices, speech samples, speech segments, and other auditory signal is intended to include the underlying data that covers the aforementioned auditory signals. Therefore, receiving a speech segment includes receiving data representing the speech segment, and outputting a speech segment includes outputting data representing the speech segment. In a similar manner, speech data can be directly (e.g., mp3 playable) or indirectly output (e.g., after conversion process) as audio.

In some embodiments, speech data includes data relating to or derived from, but not necessarily 1:1 equal to, the audio. For example, a spectrogram contains data that is extremely relevant to the audio (and arguable contains all data that you can "hear"), but is not always 100% convertible to and from the exact waveform itself. However, the exact waveform can be approximated. This type of data is intended to be included within data that represents speech.

The conversion of voices is also referred to as timbre conversion. Throughout the application, "voice" and "timbre" are used interchangeably. The timbre of the voices allows listeners to distinguish and identify particular voices that are otherwise speaking the same words at the same pitch, accent, amplitude, and cadence. Timbre is a physiological property resulting, in part, from the set of frequency components a speaker makes for a particular sound. In illustrative embodiments, the timbre of the speech segment 103 is converted to the timbre of the target voice 104, while maintaining the original cadence, rhythm, and accent/pronunciation of the source voice 102.

As an example, Arnold Schwarzenegger may use the system 100 to convert his speech segment 103 (e.g., "I'll be back") into the voice/timbre of James Earl Jones. In this example, Arnold's voice is the source voice 102 and James' voice is the target voice 104. Arnold may provide a speech sample 105 of James' voice to the system 100, which uses the speech sample 105 to convert his speech segment (as described further below). The system 100 takes the speech segment 103, converts it into James' voice 104, and outputs the converted speech segment 106 in the target voice 104. Accordingly, the speech segment 103 "I'll be back" is output in James' voice 104. However, the converted speech segment 106 maintains the original cadence, rhythm, and accent. Thus, the converted speech segment 106 sounds like James is trying to imitate Arnold's accent/pronunciation/cadence and speech segment 103. In other words, the converted speech segment 106 is the source speech segment 103 in James' timbre.

Details of how the system 100 accomplishes timbre conversion are described U.S. Pat. Nos. 10,622,002, and 10,615,826, as well as U.S. patent application Ser. No. 15/989,065, all of which are incorporated herein by reference in their entireties. In the referenced patents and application, the conversion process is referred to as a transformation of voices. For purposes of clarity in the present application, transformation from one timbre/voice to another is herein referred to as conversion and/or timbre transformation, to distinguish from the transformations performed by a robustness module. The timbre transformation process described therein outputs voices that are incredibly realistic, i.e., sufficient to fool a discriminative neural network with access to large data sets of speech from various speakers. Accordingly, the inventors recognized a need to prevent "bad actors" from improperly using timbre transformation systems. The inventors discovered that such need may be solved in the form of a watermark embedded in the converted signal (i.e., by the conversion system 100).

However, the inventors also recognized that bad actors may "break" simple watermarks that are added to the converted voice, effectively removing the watermark from the output signal 106. For example, bad actors may remove added watermarks by frequency, temporal, and/or amplitude filtering, among other ways. Even for watermarks that are more complex (e.g., embedded into the converted segment 106), it is possible to 'destroy' an otherwise detectable watermark, for example, by providing background noise during the voice conversion process. Accordingly, the inventors further recognized a need for a robust watermark that cannot easily be removed from a converted voice without destroying the overall conversion. The inventors suspect, but have not confirmed, that the robust watermark could be broken by a system having access to a large pool of speech data, the large pool of speech data including watermarked audio, and the exact same audio without the watermark.

Figure 2:
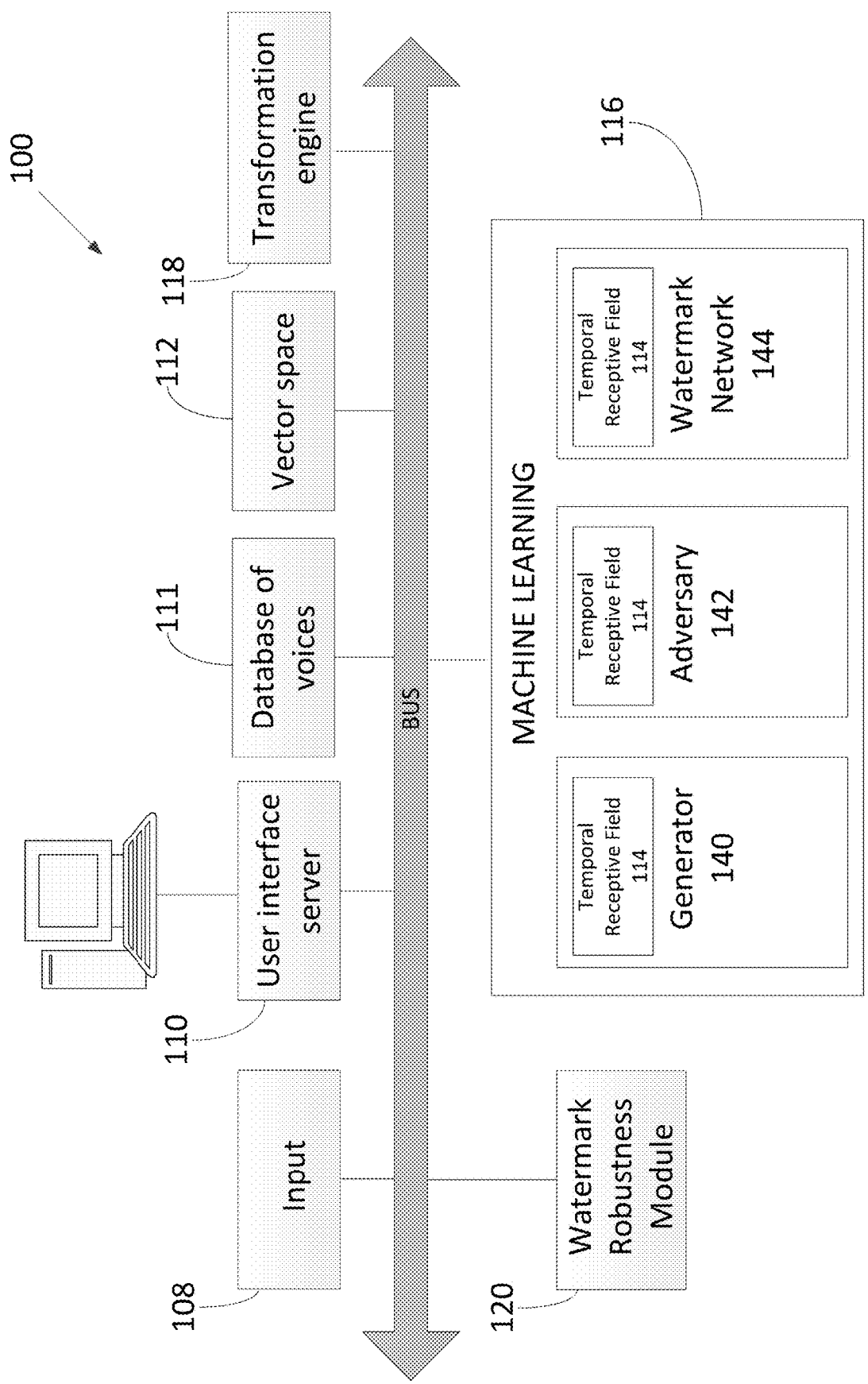
FIG. 2 schematically shows a system for embedding a robust watermark into a converted voice signal in accordance with illustrative embodiments of the invention.

FIG. 2 schematically shows a system for embedding a robust watermark into a converted voice signal in accordance with illustrative embodiments of the invention. It should be understood that the term "converted" does not mean perfectly converted. For example, the training process may have multiple cycles of conversion, and many candidate conversions prior to arriving at a conversion that is of sufficient quality to fool the adversary 142.

The system 100 has an input 108 configured to receive audio files and/or data representing the audio, e.g., the speech sample 105 in the target voice 104 and the speech segments 103 from the source voice 102. "Speech sample 105" refers to speech inputted into the system 100 in the target voice 104. The system 100 uses the speech sample 105 to extract the frequency components of the target voice 104. The system 100 converts the "speech segment 103" from the source voice 102 into the target voice 104.

The system 100 has a user interface server 110 configured to provide a user interface through which the user may communicate with the system 100. The user may access the user interface via an electronic device (such as a computer, smartphone, etc.), and use the electronic device to provide the speech segment 103 to the input 108. In some embodiments, the electronic device may be a networked device, such as an internet-connected smartphone or desktop computer. The user speech segment 103 may be, for example, a sentence spoken by the user (e.g., "I'll be back"). To that end, the user device may have an integrated microphone or an auxiliary microphone (e.g., connected by USB) for recording the user speech segment 103. Alternatively, the user may upload a pre-recorded digital file (e.g., audio file) that contains the user speech segment 103. It should be understood that the voice in the user speech segment 103 does not necessarily have to be the user's voice. The term "user speech segment 103" is used as a matter of convenience to denote a speech segment provided by the user that the system 100 transforms into a target timbre. As described earlier, the user speech segment 103 is in (or representative of) the source voice 102.

The input 108 is also configured to receive the target voice 104. To that end, the target voice 104 may be uploaded to the system 100 by the user, in a manner similar to the speech segment 103. Alternatively, the target voice 104 may be in a database of voices 111 previously provided to the system 100. As will be described in further detail below, if the target voice 104 is not already in the database of voices 111, the system 100 processes the voice 104 using a transformation engine 118 and maps it in a multi-dimensional discrete or continuous space 112 that represents encoded voice data. The representation is referred to as "mapping" the voices. When the encoded voice data is mapped, the vector space 112 makes characterizations about the voices and places them relative to one another on that basis. For example, part of the representation may have to do with pitch of the voice, or gender of the speaker.

Illustrative embodiments filter the target voice 104 into analytical segments using a temporal receptive filter 114 (also referred to as temporal receptive field 114), the transformation engine 118 extracts frequency components from the analytical segments, a machine learning system 116 maps a representation of the target voice 104 in the vector space 112 (e.g., using a voice feature extractor 120) when the target voice 104 is first received by the input 108, and the machine learning system 116 refines the mapped representation of the target voice 104. The system 100 can then be used to convert speech segments 103 into the target voice 104.

The system 100 includes a generator 140, which may be, for example, the generator 140 described in U.S. patent application Ser. No. 15/989,062, incorporated herein by reference in its entirety. The generator 140 is trained to generate realistic audio containing the watermark. The generator 140 may be a generative neural network. In some embodiments, however, the generator 140 may be any machine learning model.

The system 100 also includes an adversary 142, which may be, for example, the adversary 142 described in U.S. patent application Ser. No. 15/989,062. The adversary 142 trains the generator 140 to generate realistic audio. To the extent a candidate watermark causes the audio/speech data to sound unrealistic, the candidate watermark is removed during the training process. The adversary 142 may be a discriminative neural network. In some embodiments, however, the adversary 142 may be any machine learning model.

A watermark machine learning system 144 (that, in illustrative embodiments, is a detector that may be separate from the adversary 142 in U.S. patent application Ser. No. 15/989, 062) provides a watermark-detectability message that helps train the generator 140 to generate audio signals that have a watermark that is easily identified by the watermark machine learning system 144. The watermark machine learning system 144 may also be referred to as the watermark network 144.

In illustrative embodiments, the watermark network 144 may be a neural network. For example, the watermark network 144 may be a multiple layer deep neural network (/multilayer perceptron). Preferably, the watermark network 144 is a convolutional neural network. The watermark network 144 may also be, among other things, a recurrent neural network, or a transformer neural network. The watermark network 144 may use a variety of nonlinearities, may use different layer architectures (residual, recurrent, etc.), and may use different normalization components (layer normalization, instance normalization, etc.).

In some embodiments, the watermark network 144 may be a densely connected feedforward network. Additionally, the watermark network 144 may be trained with backpropagation, but it could also be trained through reinforcement learning or other methods. Training may include various batch sizes, be done with many different optimizers (Stochastic gradient descent, Adam, AdaGrad, etc.). Training can be done with various learning rates, various augmentations such as momentum, etc. The watermark network 144 could have various configurations of outputs, including a confidence score (from 0 to 1) indicating likelihood of a watermark existing. But it could also only output true/false, or a different number indicating presence of the watermark (not between 0 and 1). Finally, the watermark system 144 could even not be a neural network—it could potentially be a random forest, or an SVM. It is usually differentiable (as a neural network is), but it could also not be differentiable (if using, for example, reinforcement learning).

As described previously, when converting speech segments 103 (or data representing speech segments) it is desirable to include a detectable watermark. Preferably, the watermark is detectable by the watermark machine-learning system 144, but not by human listeners. In that way, the watermark does make obvious that the voice conversion is not authentic to a human listener, but is detectable as synthetic by an appropriately trained machine learning system 116. However, in some embodiments, the watermark may be human detectable.

Although in some embodiments the watermark is not human-detectable, it may still have at least some features that are audible to humans. However, the particular watermark features are embedded in a voice conversion that sounds so realistic that a human listener is unable to detect that certain audible features are a watermark.

Illustrative embodiments include a watermark robustness module 120 within the voice training system that directly trains the watermark machine learning 144 to detect watermarks in noisy environments. Accordingly, as is described further below, the watermark machine learning 144 trains the generator 140 to produce watermarked audio that can still be detected in "noisy" environments and/or where the speech data has been transformed in an attempt to break the watermark.

The robustness module 120 applies at least one robustness transformation, but may apply multiple transformations at once (it could apply them additively, multiplicatively, via composition, etc.). The robustness transformations do not include any transformations that render the transformed speech data unrecognizable (e.g., the null function, or any other transformation that destroys the data and makes using the data to provide output realistic speech data impossible.) The robustness module 120 may apply many transformations at once. However, in some embodiments, the robustness module 120 may not apply many transformations at once (otherwise it might destroy the signal and watermark entirely). In various embodiments, the robustness module 120 applies different transformations (or different combinations or parameterizations of transforms) each time it is used. The robustness module 120 itself is a program or function that takes input speech data, applies some transformation(s), and produces output speech data.

In various embodiments, the robustness module 120 may be implemented as a neural network or other machine learning system, but is more typically a simple container with a list of (potentially parameterized) transformations that randomly (or deterministically) choses some transformations (and potentially parameterizations) from that list and applies them to an input, which could be implemented as a simple random number generator and a list of functions. The transformations themselves are usually simple functions (that add a (noise) signal to the audio, or multiply it by a constant, or convolve the input with an impulse, or encode and decode it using a codec), but may themselves be compound transformations composed of multiple simple transformations.

Each of the above-described components is operatively connected by any conventional interconnect mechanism. FIG. 2 simply shows a bus communicating each of the components. Those skilled in the art should understand that this generalized representation can be modified to include other conventional direct or indirect connections. Accordingly, discussion of a bus is not intended to limit various embodiments.

Indeed, it should be noted that FIG. 2 only schematically shows each of these components. Those skilled in the art should understand that each of these components can be implemented in a variety of conventional manners, such as by using hardware, software, or a combination of hardware and software, across one or more other functional components. For example, the machine learning 116 may be implemented using a plurality of microprocessors executing firmware. As another example, the watermark network 144 may be implemented using one or more application specific integrated circuits (i.e., "ASICs") and related software, or a combination of ASICs, discrete electronic components (e.g., transistors), and microprocessors. As a further example, the machine learning 116 could be implemented on a CPU, on a GPU, on an embedded processor, on aa DSP chip, on an FPGA, on an ASIC, and/or on a homogenous or heterogeneous cluster of any of the above Accordingly, the representation of the components in a single box of FIG. 2 is for simplicity purposes only. In fact, in some embodiments, the machine learning 116 of FIG. 2 is distributed across a plurality of different machines—not necessarily within the same housing or chassis. Additionally, in some embodiments, components shown as separate may be replaced by a single component. Furthermore, certain components and sub-components in FIG. 2 are optional. For example, some embodiments may not use the watermark robustness module 120.

It should be reiterated that the representation of FIG. 2 is a significantly simplified representation of the watermark embedding voice-conversion system 100. Those skilled in the art should understand that such a device may have other physical and functional components, such as central processing units, other packet processing modules, and short-term memory. Accordingly, this discussion is not intended to suggest that FIG. 2 represents all of the elements of the watermark embedding voice-conversion system 100.

Figure 3:
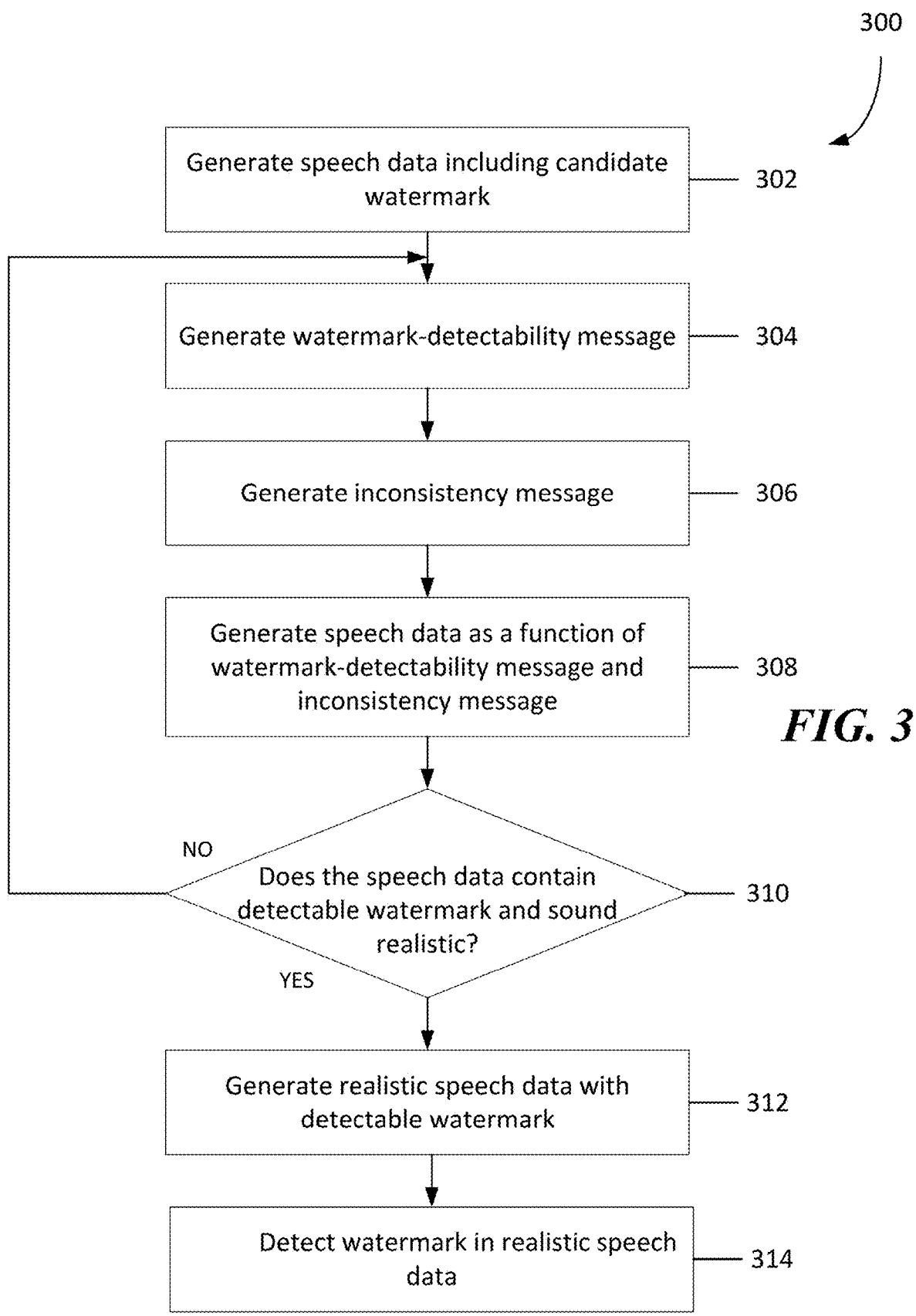
FIG. 3 shows a process of training machine learning to generate realistic speech data including a detectable watermark in accordance with illustrative embodiments of the invention.

FIG. 3 shows a process of training machine learning 116 to generate speech data including a watermark in accordance with illustrative embodiments of the invention. It should be noted that this process can be a simplified version of a more complex process training machine learning to generate speech data including a watermark. As such, the process may have additional steps that are not discussed. In addition, some steps may be optional, performed in a different order, or in parallel with each other. Accordingly, discussion of this process is illustrative and not intended to limit various embodiments of the invention.

The process begins at step 302, which generates first speech data that includes a candidate watermark. In illustrative embodiments, the machine learning system 116 is used to generate the speech data.

Figure 4:
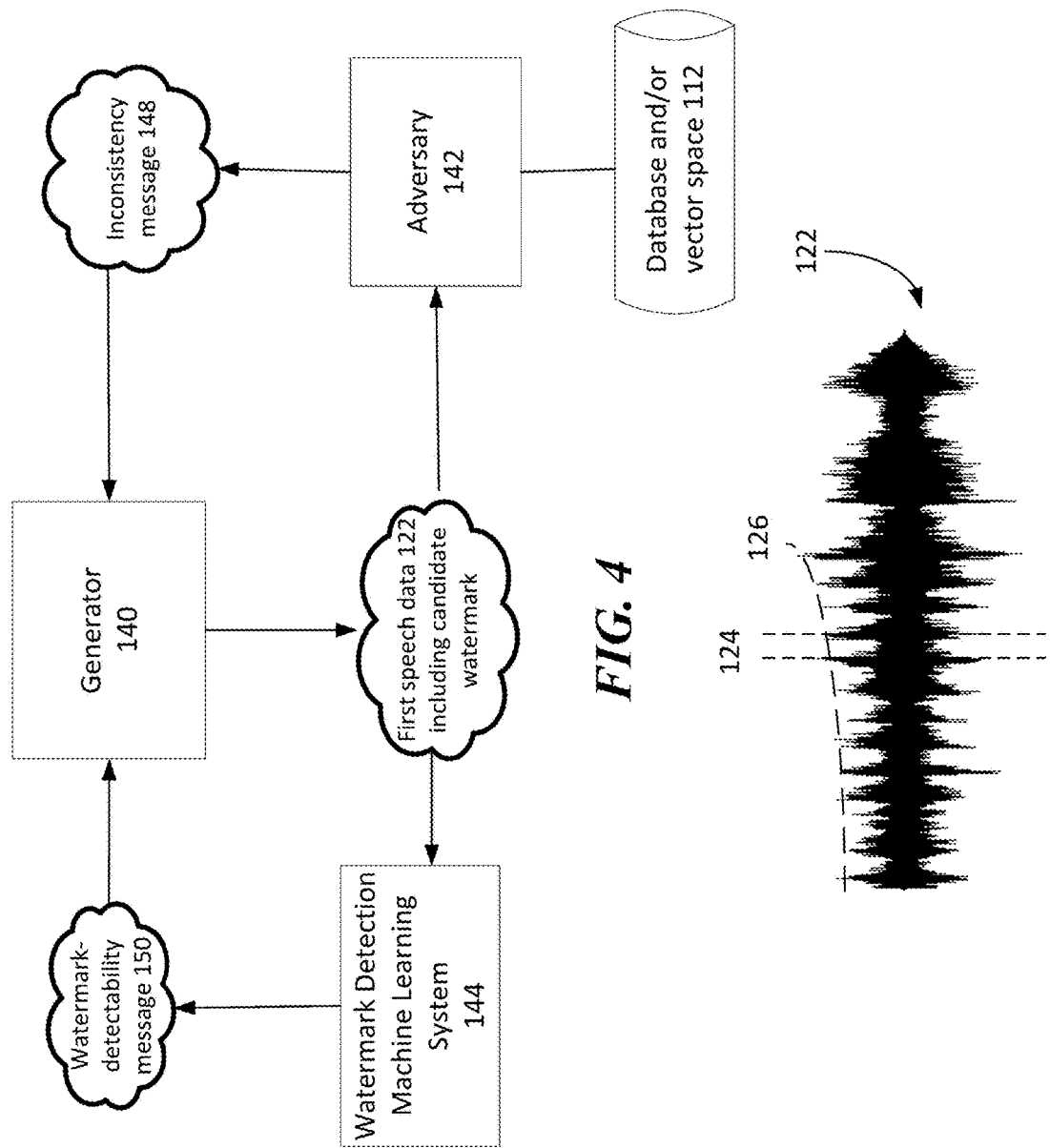
FIG. 4 shows a block diagram of the machine learning system trained in accordance with illustrative embodiments of the invention.

FIG. 4 shows a block diagram of the machine learning system 116 trained in accordance with illustrative embodiments of the invention. Preferably, the machine learning system 116 includes a neural network, such as a generative neural network 140 (also referred to as the generator 140). The generator 140 is configured to generate speech data 122 that includes the watermark.

During initial training of the system 100, the generator 140 produces first speech data that is configured to sound like the target voice 104, e.g., the first speech data is configured to represent human speech. In illustrative embodiments, the first speech data includes the candidate watermark (i.e., the candidate watermark is part of the speech data, it is not necessarily a separate feature). The term candidate watermark is used to refer to the training process, where the watermark has not yet been finalized by the system 116. Instead, the generator 140 produces many different candidates, and the process 300 refines the candidate watermark to produce the final watermark (also referred to as the trained watermark or simply the watermark).

Figure 5:
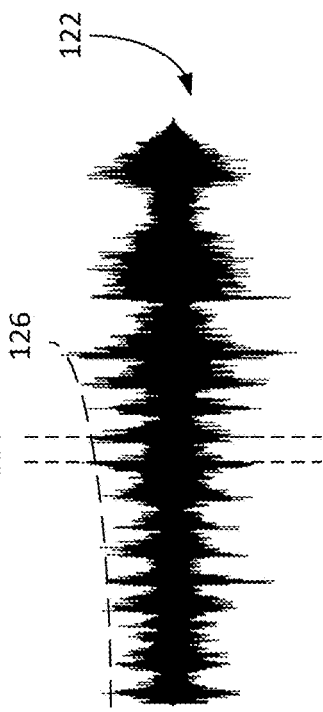
FIG. 5 schematically shows a visual example of speech data in accordance with illustrative embodiments of the invention.

FIG. 5 schematically shows a visual example of the speech data 122 in accordance with illustrative embodiments of the invention. In various embodiments, the speech data 122 may be represented by a waveform, a spectrogram, or other data (e.g., defined by the neural network and not comprehensible by outside observers). Accordingly, the use of the simple waveform is intended to facilitate discussion, and not intended to limit various embodiments. Additionally, although the speech data 122 is provided with a different reference numeral, it should be understood that the speech segment 103, the speech sample 105, and the converted speech segment 106, all contain speech data 122. These various examples of audio signals 103, 105, and 106 merely signify the source that generated the signal, but all inherently contain speech data.

As used in this application, the term speech data 122 includes any data representative of speech. Human speech is considered to include singing, talking, and other variations of realistic human sounds that may be made by the human voice. Furthermore, illustrative embodiments may generate non-humanoid speech. For example, it is contemplated that illustrative embodiments may operate as a video game integration. Video games frequently have non-humanoid characters. Accordingly, illustrative embodiments may generate speech data 122 that is "authentic" to a particular non-humanoid synthetically-generated voice (e.g., an orc, such as Thrall from WarCraft 3 by Blizzard, or other video game character, such as Omen from Valorant by Riot).

Furthermore, it should be understood that the generator 140 attempts to generate authentic sounding speech data. Authentic speech data is data obtained, directly or indirectly, from the source 102. In contrast, synthetic speech data is generated by the generator 140. Both authentic speech data and synthetic speech data fall within the category of speech data 122. However, the generated speech data is not authentic (e.g., human) speech. It should be understood that in some embodiments the source for authentic data may itself by synthetic speech data (e.g., video game character), and therefore, in that case, the "authentic" data is synthetic data produced by some other system. In such embodiments, the synthetic data is speech data produced by the generator 140 that attempts to appear realistic with respect to the "authentic" data.

At step 304, a watermark-detectability message 150 is generated. The watermark-detectability message relates to a particular feature or features of the audio that the machine learning system 144 believes would increase the likelihood of detection of the candidate watermark. In practice, the watermark-detectability message may relate to thousands of combinations of features at a time. Thus, the watermark-detectability message 150 relates to features of the speech data 122 that exists already.

Although the above described watermark-detectability message 150 is described as relating to features of the speech data 122 that already exists, in some embodiments, the watermark network 155 may generate entirely new suggestions for watermark data. For example, the watermark network 144 may randomly generate a feature or set of features, select those which it could plausibly detect, and then suggest that selection. In such embodiments, the watermark network 144 could bias that generation based on human expertise around what features might be best to suggest.

To generate the watermark-detectability message 150, and as shown in FIG. 4, the speech data 122 is received by the watermark machine learning system 144. The watermark machine learning system 144 analyzes the speech data 122 and identifies a suitable candidate watermark. Thus, it should be understood that the candidate watermark is one or more features of the speech data 122 that the watermark machine learning system 144 believes increases the likelihood of detection.

At the beginning of the training process, the suitable candidate watermark may be a random feature of the speech data 122. For example, as shown in FIG. 5, the watermark detection machine learning system 144 may consider the timing 124 between peaks to be a desirable candidate watermark. Accordingly, the watermark network 144 generates the watermark-detectability message 150 instructing the generator 140 to use the timing 124 between peaks as at least a portion of the candidate watermark.

The watermark machine learning 144 is trained to discern whether a watermark exists (in general), whether a specific watermark exists, and to provide the watermark-detectability message 150 to the generator 140 regarding how to improve the detectability of the watermark. In some embodiments, the watermark detectability message 150 simultaneously provides feedback as to adjusting the watermark to reduce the probability that a human can detect the watermark. In illustrative embodiments, the watermark machine learning system 144 is trained using back-propagation.

In illustrative embodiments, the watermark improvement message 150 is the gradient of the watermark network 144 output with respect to the transformed speech data 122 input. But it could be a scaled, or averaged, or quantized version of that gradient. Typically, the gradient is calculated through backpropagation if the watermark system 144 is differentiable, but it could also be calculated through reinforcement learning or other techniques. In some embodiments, the watermark-detectability message 150 could also be a small subset or very noisy version of the gradient, which is only very weakly related to the gradient.

The process then proceeds to step 306, which generates an inconsistency message 148. Returning to FIG. 4, the adversary 142 (e.g., a discriminative neural network) receives the first speech data 122 that includes the candidate watermark. The adversary 142 is configured to compare the first speech data 122 that represents the target voice 104 with voice data representing a plurality of different voices in the database 112. Preferably, the database 112 is a vector space 112 having a plurality of voices mapped therein. Conceptually, by comparing the first speech data 122 to a plurality of different voices, the adversary 142 determines that the first speech data 122 does not 'sound' like the target voice 104 or the class of voice the speech data 122 is supposed to sound like (e.g., a human voice). The inconsistency message 148 describes inconsistencies between the generated first speech data 122 and the target voice 104.

In this description where the target voice is used in comparison with a plurality of other voices, it is definitely "does not sound like the target voice". In general applications which may not be doing voice conversion, it could be general human speech (or non-human speech, etc.). But in this particular description, it's the target voice.

In various embodiments, the system 100 may select the voice that it trains to mimic. In some embodiments, the voice may generally be a human voice. In some other embodiments, the voice may be a particular target voice. To that end, the inconsistency message 148 describes that the speech data 122 does not sound like a human (i.e., the speech data 122 doesn't seem to belong the authentic human data set that the adversary 142 is provided). In an example of a general case, the inconsistency message 148 may relate to the overall distribution of human data sets (other examples may include non-human data sets). However, in illustrative embodiments, the inconsistency message 148 may be relative to a particular target 104. In such instances, the data set provided to the adversary 142 may include authentic data for the target 104 speaker. Preferably, the inconsistency message 148 relates to a plurality of voices (whether it is relative to the general case of a human voice or relative to the specific case of a particular target 104). This is because the larger data set allows the adversary 142 to provide better information in the inconsistency message 148, differentiating the unique features of the target voice in comparison with other similar voices, allowing the generator 140 to produce speech data that more precisely resembles the target speaker.

In various embodiments, the generator 140 may be trained to produce a watermark that differs based on the speaker (or based on the phonetic content of the speech, or other features of the speech, etc.)". For example, the watermark may have some (or all) different features for different speakers. For example, a male speaker may have X base frequency so Y frequency works, but a female voice could require a different frequency because the Y frequency would stick out. In some embodiments, however, the generator 140 may be trained to produce a universal watermark the works regardless of target speaker. Furthermore, some embodiments may have some combination of individualized and generic watermarks, where some features of the watermark are common among various speakers, but also include customized features for the individual. In practice, human observers are unable to tell what the watermark is, which is one reason why the watermark is robust to breaking.

For clarification, the adversary 142 does not compare the first speech data 122 to a single sample 105 of target speech. Instead, the adversary 142 compares overall pattern differences between the generated speech data 122 and many data sets of realistic and/or real human speech (which may or may not include samples of the target voice) and produces the inconsistency message 148. Additionally, the inconsistency message 148 may indicate that some frequencies in the speech are outside of the human speech or hearing range, and are therefore unrealistic. The inconsistency message 148 may also indicate that the sound being made is not a typical human speech sound and is therefore unrealistic. As yet another option, the inconsistency message 148 could indicate that there are artifacts in the speech that are indicative of synthetic generation and is therefore unrealistic.

At step 308, second speech data is generated as a function of the watermark-detectability message 150 and the inconsistency message 148. To that end, the generator 140 receives the watermark-detectability message 150 and the inconsistency message 148, and the generator 140 updates its model for generating the target voice 104.

The process then proceeds to step 310, which asks whether the generated speech data 122 contains a detectable watermark and sounds authentic. If the answer to either of these questions is no, then the process returns to step 304. The steps of generating the watermark-detectability message 150, generating the inconsistency message 148, and using the watermark-detectability message 150 and the inconsistency message 148 to generate new speech data 122 is repeated until the adversary 142 can no longer detect the generated speech data 122, which includes a detectable watermark, as inauthentic.

For example, the adversary 142 may determine that maintaining the timing 124 between peaks, as shown in FIG. 5, causes the speech data 122 to be detectable as synthetic. Accordingly, the adversary 142 produces a second inconsistency message 148, instructing the generator 140 to adjust the timing 124 between peaks.

Continuing this example, the watermark machine learning 144 may identify the rising spectral envelope 126 of the speech data 122 as a potential watermark candidate. The watermark network 144 then sends a follow-up watermark-detectability message 150 instructing the generator 140 to create new speech data 122 with the rising spectral envelope 126. The new speech data 122 is considered by the adversary 142, which may determine that the new candidate watermark is an undesirable feature (e.g., because it causes the speech data to seem inauthentic).

Although illustrative embodiments have referred to discrete examples of candidate watermarks (e.g., timing 124 between peaks as a first candidate, and rising spectral envelope 126 as a second candidate), this is merely for discussion purposes. It should be understood by one of skill in the art that the candidate watermark may be considerably more complex than the simple examples provided. In practice, it is likely that the candidate watermark is a complication of many "features" together, rather than discrete discernable features.

The steps of 304-310 are repeated until the speech data 122 contains a detectable watermark and sounds realistic. "Detectable" is a user-chosen parameter dependent on the application, but could include, e.g., that the average confidence in detection over the past 1000 cycles was at least 95%, at least 96%, at least 99%, or at least 99.9%. Illustrative embodiments may also refer to detectability of the watermark as relating to false positive and false negative rates, e.g., the false positive rate over the past 1000 steps was 0.1% or less while the false negative rate was less than 1%.

Although steps 304 and 306 are shown in sequence, a person of skill in the art understands that the adversary 142 and the watermark machine learning 144 do not necessarily operate in sequence. For example, training the generator 140 to produce authentic sound speech data 122 may require considerably more training than training the generator 140 to produce speech data 122 with the detectable watermark. Accordingly, steps 304 and 306 may occur at different rates, in different orders, and/or at different times.

Additionally, although FIG. 3 shows training the watermark and voice-conversion as occurring in sequence, in some embodiments, the watermark may be trained after the voice is converted. Thus, a previously trained voice-conversion system may begin training to embed a watermark in converted voices. However, in various embodiments, training both the voice conversion system and the watermark embedding system simultaneously advantageously produces authentic sounding speech with a robust watermark.

Returning to FIG. 3, at step 310, if the speech data 122 contains a detectable watermark and sounds realistic, then the process proceeds to step 312. At step 312, the voice-conversion system 100 is used to generate speech data 122 that includes a detectable watermark (e.g., by the watermark machine learning 144) embedded in the speech data 122 that sounds realistic (i.e., not detectable as inauthentic by the adversary 142). Specifically, the generator 140 generates realistic sounding speech data 122 that includes the detectable watermark because it has been trained by the adversary 142 and the watermark machine learning 144 together.

It is worth nothing that there is a significant distinction between the operation of the adversary 142 and the watermark network 144. Unlike the inconsistency message 148, which informs the generator 140 as to undesirable (e.g., inauthentic) characteristics of the speech data 122, the watermark-detectability message 150 instructs the generator 140 to pursue a particular characteristic of the speech data 122 further. In other words, the watermark-detectability message 150 determines certain features as desirable watermarks, and causes the candidate watermarks to update to a next version. In other words, the adversary 142 operates as a discriminator, detecting differences between real and synthetic speech and/or speech data. In contrast, the watermark network 144 searches the signal for suitable watermark and/or watermark features that may be included in the signal. The combination of the two machine learning systems 142 and 144 allows the voice-conversion system 100 to generate synthetic speech that includes the detectable watermark and sounds as if it was from the target voice 104.

The process then optionally proceeds to step 314, where the watermark machine learning system 144 detects the watermark in realistic speech data 122. In illustrative embodiments, realistic speech data is speech data that the adversary 144 has a 95% or greater, 99% or greater, or 99.9% or greater confidence level as being authentic speech generated by the target. In illustrative embodiments, the generator 140 and the watermark system 144 are preferably paired, meaning, that the watermark in the speech data 122 is detected by the watermark system 144 that trained the generator 140. This is because the watermark network 144 may train the generator 140 in a 1 variety of ways to embed the watermark in the speech data 122. However, the generator 140 has specifically been trained by the watermark network 144, and thus, the watermark in the generated speech data 122 is detectable by the watermark network 144. If the watermark network 144 had not trained the generator 140, then the watermark cannot confidently and reliably be detected by the watermark network 144.

By using the watermark network 144 to detect the watermark, synthetic speech data 122 can be detected, even if it sounds realistic. This is particularly significant where the machine learning system 116 has been trained to produce realistic sounding voice conversions (i.e., sufficient to fool a discriminator). By requiring that the system 100 embed a watermark during voice conversions, the voice-conversion technology described in U.S. Pat. Nos. 10,622,002, and 10,615,826, as well as U.S. patent application Ser. No. 15/989,065, can be used ethically, and without fear that a bad actor may improperly use voice conversions without detection. Furthermore, the training method described in the referenced patent applications can be used to train multiple generators 140. In that sense, the watermark network 144 acts as a "master detector," capable of detecting watermarked speech generated from all of the trained generators 140. As an added benefit, another watermark network 144 that did not train the generator 140 is likely unable to reliably detect voice conversions.

Although not shown in FIG. 3, in some embodiments, the process 300 also asks whether the watermark is detectable by humans. If the watermark is detectable by humans, then the process is repeated again until the watermark is not detectable by humans. In such embodiments, the watermark-detectability message 150 contains information regarding how to make the watermark detectable by the watermark network 144 without being detectable by humans. Alternatively, or additionally, the adversary 142 may be trained to produce an inconsistency message 148 that considers any detectable watermark to be inauthentic speech.

Accordingly, illustrative embodiments train the generator 140 to generate synthetic speech that is substantially identical to authentic speech (e.g., synthetic speech not detectable as inauthentic by a trained neural network, and/or producing a null inconsistency message 148). The generated speech data 122 can be substantially identical to real human speech data 122, especially when the generator 140 is fully trained. Therefore, the term authentic speech data 122 and generated speech data 122 may, in some instances, merely describe the source of the speech data 122 (e.g., authentic vs. synthetic) as opposed to a distinguishable characteristic between the data 122. Accordingly, realistic speech and/or realistic speech data 122 refers to the adversary 142 can't tell the difference between the generated speech and the real speech from the real data set, and in particular at convergence (after you train this for a long time, there are no changes, e.g., the inconsistency message 148 detects nearly zero inconsistencies on average over a large number of attempts, or the adversary 142 has high confidence that the speech data is authentic over long period of time).

Figure 6:
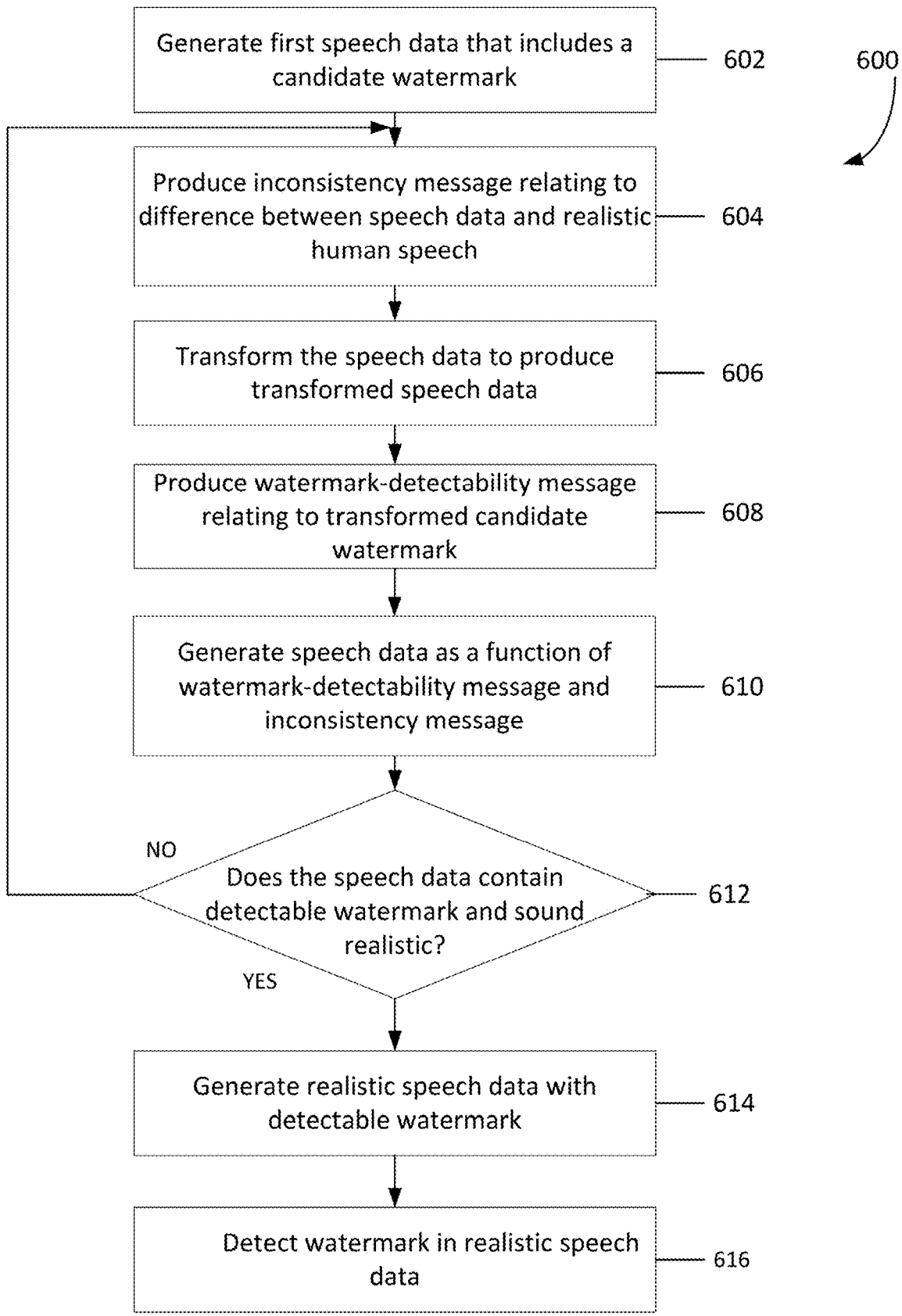
FIG. 6 shows another process of training machine learning to generate speech data including a watermark in accordance with illustrative embodiments of the invention.

FIG. 6 shows another process of training machine learning 116 to generate speech data including a watermark in accordance with illustrative embodiments of the invention. In a manner similar to step 302, step 602 generates first speech data that includes a candidate watermark. Furthermore, in a manner similar to step 306, step 604 produces an inconsistency message 148. Accordingly, a detailed discussion of steps 602 and 604 is not repeated, as it is substantially identical to discussion of steps 302 and 306, respectively.

The process 600 proceeds to step 606, which transforms the speech data. Illustrative embodiments use a robustness module 120 to transform the speech data. The transformations produce speech data 122 which is not identical to the input speech data, but which is related to it. The transformations may often be invertible, and usually differentiable (but may not have to be). The transformations are composable in any order, so applying one transformation and then another is a valid transformation, and so is applying them in a different order. In illustrative embodiments, the transformations should further be limited to those transformations that result in output speech data 122 (referred to as updated speech data or new speech data) that is recognizably similar to the input speech data 122 (e.g. if the input is Arnold saying a sentence the output should recognizably be Arnold saying the same sentence).

While illustrative embodiments contemplate producing the inconsistency message 148 relating to generated first speech data, and then transforming the first speech data, which is then used to produce the watermark-detectability message 150, some embodiments may differ. In some embodiments, is possible to have a process where different data is used for the inconsistency message 148 and the watermark detectability message. For example, illustrative embodiments may produce an inconsistency message relating to the first speech data, and provide that inconsistency message 148 to the generator 140. The generator may then generate second speech data as a function of the inconsistency message, transform the second speech data, and use the transformed second speech data to produce a watermark-detectability message 150. The watermark-detectability message 150 may be fed back to the generator 140 and used to produce third speech data. The third speech data may then be used to produce a new inconsistency message 148, a new watermark-detectability message 150, or both. Regardless of the sequence of training, the iterative process results in updated speech data that is directly, or indirectly, a function of the watermark-detectability message 150 the inconsistency message 148. However, in preferred embodiments, the same generated speech data is used to produce the inconsistency message 148, and is transformed to produce the watermark-detectability message 150. This process, or variations thereof, may then be repeated.

Figure 7:
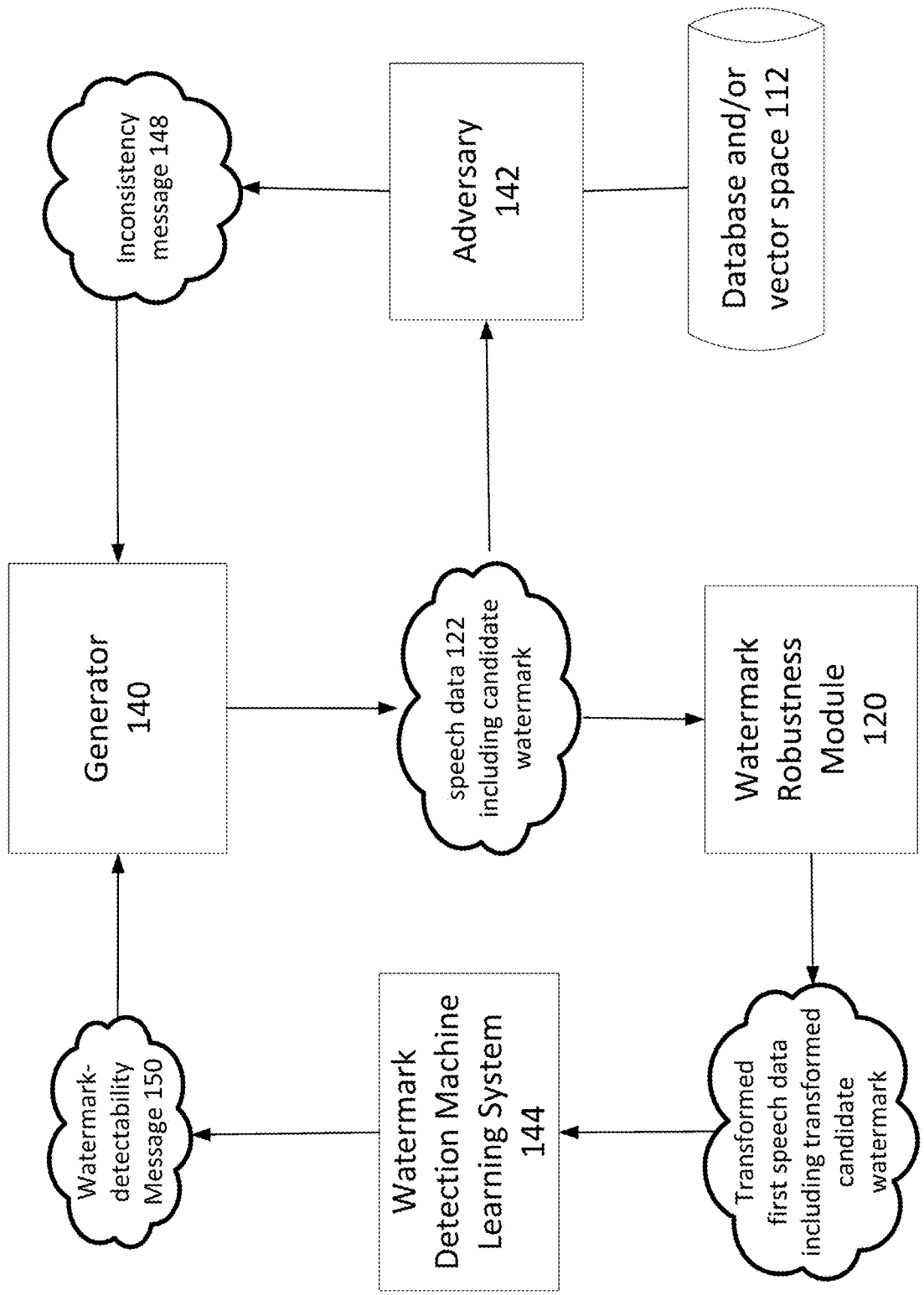
FIG. 7 schematically shows a block diagram of the machine learning system trained in accordance with illustrative embodiments of the invention.

FIG. 7 schematically shows a block diagram of the machine learning system 116 being trained in accordance with the process of FIG. 6.

The watermark robustness module 120 transforms the speech data. In some embodiments, the watermark robustness module 120 may also be referred to as a "noise module 120", because, among other things, the watermark robustness module 120 may add noise in the background of the speech data 122. However, the term noise module 120 is too narrow because a variety of transformations are contemplated beyond adding background noise in the signal.

In illustrative embodiments, the watermark robustness module 120 may perform the following transformations on the speech data 122. Transformations performed by the watermark robustness module 120 may include: adding white noise, or brown noise, or pink noise, etc. Scaling the volume of the audio. Adding new audio signals (traffic audio, background speech audio, wind sounds, typing sounds, animal sounds, mechanical sounds, etc.). Introducing reverberation (typically by convolving with an impulse response), to make the audio sound as if it's in a cathedral, or a house, or a small room, or a suit of armor, or a forest, or a graveyard, or an open plain. Mimicking the distortion produced by other microphones to make the audio sound like it was recorded with a different microphone. Adding "effects" from music (e.g., guitar pedals). De-noising or de-essing. Equalization in general (e.g. emphasizing the low frequencies, or high frequencies, or mid frequencies). Low pass or high pass filters. Phase shifting, pitch shifting, time stretching, etc. Clipping, encoding and decoding with respect to different audio codecs. Sample rate changes, sample dropouts, silencing sections. Playing the audio through speakers and re-recording with a microphone (the "analog hole"). This list is merely exemplary and not intended to provide an exhaustive list of the various transformations that may be made by the watermark robustness module 120. Nor does the robustness module 120 necessarily need to perform any of the exact transformations listed above.

Instead, the watermark robustness module 120 may have a large compilation of songs, videos, speech, in a database that are used to perform the transformation (e.g., adding, sample-by-sample, the songs or speech to the speech data, to mimic the speech data being recorded in a room with other background speech or singing. In some embodiments, the watermark robustness module 120 may convolve different impulse responses from, for example, different rooms or environments over the speech data to mimic the speech being said in a new environment). Additionally, or alternatively, the watermark robustness module 120 may add the speech data to various streamed songs, videos, speech online sources, such as YouTube videos, Spotify playlists, etc.

The watermark robustness module 120 is distinct from background sound that may already be present in an input signal (e.g., the speech sample 105). Even if the original input signal has background noise, the robustness module 120 adds more noises/transformations. Preferably, the watermark robustness module 120 performs a plurality of transformations representing a wide variety of background sounds. For example, the watermark robustness module may perform transformations configured to replicate converting to mp3 and back, a bad mp3 player, people talking in French in the background, sample rate conversions, data compressions, speaker impulse responses, thousands of data input responses, different types of room responses, (e.g., in an apartment, in a concert hall, in a studio), etc.

Furthermore, in general, the speech sample 105 and other data representing speakers in the vector space 112 is preferably "clean" input audio without background noise. This is because any input that is not the speaker's timbre (e.g., the data used to provide the target voice 104) confuses the generator 140. For example, if car sounds are in the background in a particular target 104 timbre data, then the system 100 may erroneously believe that the target 104 voice includes car sounds. Thus, prior art voice-conversion systems preferably have clean audio, and do not purposefully introduce background noise. Indeed, the prior art takes considerable effort dedicated to making sure that the training input audio is as clean as possible. In contrast, illustrative embodiments of the watermark robustness module 120 transform the speech data 122 to include background sounds purposefully to train the system 116 against breaking of the watermark.

The process proceeds to step 608, which detects desirable candidate watermarks in the transformed speech data and produces the watermark detectability message. It should be understood that the desirable candidate watermark that is "detectable" is based on the post-transformation. Meaning, the detected feature may not be, and likely is not, identical to the initial feature in the speech data 122 that led to that desirable detectable watermark characteristic in the transformed speech data. Instead, the watermark machine learning 144 identifies a post-transformation speech data characteristic that it believes is a desirable candidate watermark. Furthermore, the desirable candidate watermark may end up being a desirable watermark feature after transformation, and the machine learning system 116 determines the pre-transformation feature that relate to the desirable post-transformation feature.

Most features in the transformed speech data are related to the pre-transformation speech (i.e., speech data before transformation by the robustness module 120). Thus, features in the transformed speech that are good watermark candidates provides information about features that should be emphasized in the pre-transformed speech. Additionally, the robustness module 120 applies a variety of different transformations (or, at least can—and should probably—do so) so any systematic transformation done by the robustness model is averaged out over training. Therefore, only features which reliably, under many different transformations by the robustness module, produce post-transformation watermark candidates that are readily detected, are emphasized over time during training.

As a simplified example, a pre-transformation candidate watermark feature may be a hum at a given frequency. The robustness module picks a transformation, for example, that doubles the volume of the speed data. Then the pre-transformation watermark candidate feature is the hum, and the post-transformation watermark candidate feature is 2× the volume of the hum. While the features are not exactly identical, they are clearly related, and the watermark robustness module 120 2× hum transformation can pass back as part of the watermark improvement message concerning the original hum. A person of skill in the art understands that this is a very simplified example for discussion purposes that is not likely to occur in practice. Furthermore, as a practical matter, such a transformation would be detected and removed by the adversary 142 for causing unrealistic sounding speech.

As yet another example, the candidate watermark feature may include having the quantized difference between the fundamental frequency of two adjacent sounds with different fundamental frequencies be an even number. The robustness module may transform the signal (e.g., by adding an impulse response convolution so that it sounds like the speech data is coming over a radio). Even though the resultant frequencies now all have different amplitudes, the difference between the frequencies is still an even number of Hertz, so while the signals have changed, the feature of the watermark has persisted, and that can be emphasized in the watermark-detectability message.

Regardless of the transformation, except in exceptional circumstances, it is possible to relate the pre-transformation candidate watermark feature to the post-transformation candidate watermark feature. This is because the robustness module 120 communicates with the watermark machine learning system 144. Accordingly, the watermark machine learning system 144 can generally relate the transformed feature to the pre-transformed feature. However, this is not the case where the transformation is multiplying the speech data 122 by 0, or the transformation destroys the quality of the audio signal (e.g., the converted voice is clearly unrealistic or inaudible). In such a case, the watermark is also destroyed, but the conversion also does not sound realistic, obviating the need for a watermark.

It should be further understood that during training, in some steps, there may not be a detectable watermark. Accordingly, the watermark-detectability message may return a null value. For example, if the audio signal is destroyed, (e.g., multiplied by 0), the watermark network 144 may not find a desirable watermark feature.

Returning to the process 600 of FIG. 6, at step 610, speech data 122 is generated as a function of the watermark-detectability message 150 and the inconsistency message 148. As shown in FIG. 7, the generator 140 receives the watermark detectability message 150 and the inconsistency message 148. Step 610 is similar to step 308, and therefore, is not repeated here. In general, the training process involves many cycles of watermark-detectability messages 148 and inconsistency messages 150 to produce authentic sounding watermarked speech. It should be understood that the watermark-detectability message 148 and the inconsistency message 150 is not a "readable" message that would be understandable by an outside observer, not does it necessarily contain a comprehensible communication. In illustrative embodiments, the messages include communications sent from one neural network to another. The watermark-detectability message 150 would typically be a vector or batch of vectors describing gradient information at the per-sample level with respect to the batch of transformed inputs. The vectors are typically embodied as lists of numbers (float point numbers, or less commonly quantized to integers). This gradient vector may be transformed by further backpropagation through the robustness module 120 if the transformations selected by the robustness module 120 on that batch were all differentiable.

The process then proceeds to step 612, which asks whether the generated speech data contains a detectable watermark and sounds realistic. If the watermark is not detectable by the watermark network 144, or the speech data is detected as synthetic (i.e., not realistic) by the adversary 142, then the process returns to step 604. Steps 604-612 are repeated until the adversary 142 can no longer detect the generated speech as inauthentic, and the generated speech includes a detectable watermark.

The process then proceeds to step 614, which generates realistic speech data that includes the detectable robust watermark. Because the generator 140 is trained using the robustness module 120, the watermark cannot be removed from the speech data without destroying the speech data. Thus, the generator 140 may be used by a variety of users to convert voices from the source voice 102 to the target voice 104, and the generator 140 embeds the watermark in the speech data. Any attempts to use the system 100 for real-time voice-conversion and to break/remove the watermark fails because the watermark is robust to attempts to break it.

Attempts by a "bad actor" to break the watermark must still preserve some aspects of the speech (e.g., if the speech is Arnold saying a sentence, after trying to break the watermark, the audio must still sound like Arnold saying that sentence, otherwise it is useless to the attacker). Thus, even with attempts to break the watermark, the audio is not totally destroyed, and some aspects of the audio remain (speech content, speaker identity, etc.). Since the robustness module 120 has forced the generator 140 to produce a watermark signal that has some features that are not removed by a wide variety of distortions or other attacks—all of which are transformations of some kind—some watermark features are present after the attacker has distorted the audio. The outcome is distorted audio, which nevertheless is detected as having a watermark by the watermark network 144.

At step 616, the watermark network 144 receives speech (or speech data), and detects for the watermark. If the watermark network 144 detects the watermark, then the system knows that the speech is synthetic (regardless of whether it otherwise appears to be realistic). If the watermark is not detected, then the speech may be synthetic, but it was not generated using the paired generator 140. The process then comes to an end.

It should be understood that although various embodiments refer to watermarking speech data, the speech data represents speech. Therefore, illustrative embodiments also may watermark speech. Additionally, or alternatively, illustrative embodiments may operate on a variety of different media.

It should further be understood by those of skill in the art that simply adding a watermark to a converted voice signal is not sufficient to provide a robust watermark capable of withstanding dedicated removal attempts.

U.S. Pat. Nos. 10,622,002, and 10,615,826, as well as U.S. patent application Ser. No. 15/989,065, incorporated herein by reference, refer to added frequency components as a "watermark." In the present application, illustrative embodiments of the watermark refer to previously existing characteristics of the speech data that can be enhanced. This is in contrast to the "watermark" referred to in the incorporated applications, which describe adding a frequency component on top of the speech data. Such prior art watermarks are easily detectable, and more importantly, easily removable. Illustrative embodiments advantageously train the generator 140 to embed the watermark in converted speech so as to be generally undetectable, except by the watermark network used to train the generator 140.

Figure 8:
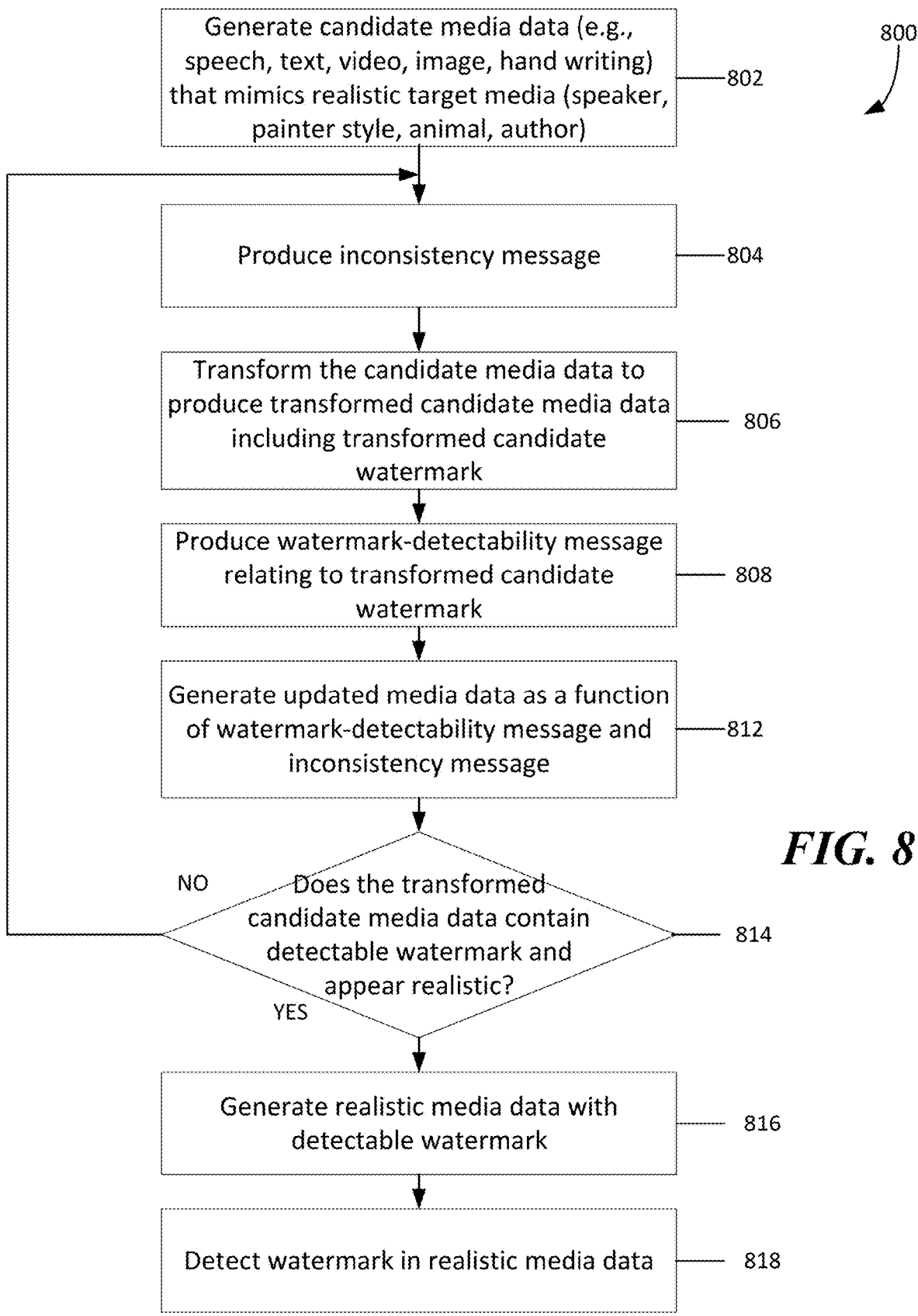
FIG. 8 schematically shows a process of training a system to generate media with a watermark in accordance with illustrative embodiments of the invention.

FIG. 8 schematically shows a process of training a system to generate media with a watermark in accordance with illustrative embodiments of the invention. Although illustrative embodiments refer to techniques for modifying speech, it should be apparent to those of skill in the art that the watermarking techniques described herein may also be used on video, arbitrary audio, text, etc.

The process begins at step 802, which generates candidate media data representing a particular type of media (e.g., speech, text, video, image, hand writing). To that end, the generator 140 is trained to generate the media. The generator 140 has access to the database 112 with a large stockpile of media for reference. For example, when the media is images of dogs, the generator 140 has access to a database 112 with images of dogs. The generator 112 learns to generate images of dogs from the stockpile of images. This is because of the adversary 142. The generator 140 produces candidate images of dogs, and the adversary 142 receives those candidate images and sends an inconsistency message 148 to the generator 140. The inconsistency message 148 provides the generator 140 with information about how to improve its candidate images to look more like dogs. This process is iterated until the generator 140 accurately generates images of dogs.

The process then proceeds to step 804, where an adversary 142 trains the generator 140 to produce realistic media by producing an inconsistency message 148. The adversary 142 also has access to a large set of data of the media (e.g., pictures of dogs). The adversary 142 is particularly trained to find commonalities between the large collection of images of dogs, and therefore can detect when the generated image is inauthentic. In illustrative embodiments, the training is accomplished by generating an inconsistency message 148 as described previously.

At step 806, the watermark robustness module 120 transforms the candidate media data including the candidate watermark. As previously described, the transformation occurs in an attempt to train the generator 140 to produce watermarks that are resistant to breaking by a bad actor. For example, image transformations could include rotations, translations, cropping, scaling, general affine transformations, additions of noise, additions of lens distortion, color palette shifting, color inversion, greyscale, general "filters" (photoshop, Instagram, etc.), motion blur, redaction of parts of the image, combinations/composition of many of these techniques, etc.

It should be understood that depending on the type of media, the watermark robustness module 120 performs a variety of transformations. For example, video transformations may include any image transformations applied in sequence, along with any audio transformations. It could include time warping, time reversal, artificial shaking or steadying, transitions, artificial depth changing, etc. Text transformations could include subtle misspellings or alternate spellings, inclusion of accents, inclusion of punctuation or removal of punctuation, usage of synonyms or rephrasings, etc. Hand writing could be writing style transfer (look like someone else's handwriting) or any image or text transformations.

At step 808, the watermark machine learning 144 trains the generator 140 to produce a watermark that is detectable by the watermark machine learning 144. Preferably, the watermark is not detectable by humans. The watermark network 144 may notice in a particular image that a center pixel of the image has a pixel value of 1 greater than the average of the eight pixels surrounding the center pixel. The watermark machine learning 144 may create a watermark-detectability message 150 indicating that this feature is an easily detectable watermark feature.

Continuing the previous example, the generator 140 may take the watermark-detectability message 150 and generate updated media that includes features such as averaging the pixel values of the 8 pixels surrounding a center pixel of the image, adding 1 to that value, and assigning that pixel value to the center pixel. While a human observer hypothetically can see such a pixel, it is unlikely the individual pixel value would cause the image to look synthetic, or that the pixel value can be detected as a watermark by the human observer. In contrast, the watermark machine learning system 144 has trained the generator 140 to produce the watermark, and knows the various complex features of the watermark to look for. Furthermore, the watermark system 144 trains the generator 140 in conjunction with the adversary 142 to create realistic images with the watermark.

At step 812, the generator 140 generates updated media data as a function of the watermark-detectability message 150 and the inconsistency message 148. In illustrative embodiments, the watermark-detectability message 150 trains the generator 140 to produce a better watermark, and the inconsistency message 148 trains the generator 140 to produce more realistic media.

At step 814, the process asks whether the transformed generated media is realistic and contains a detectable watermark. If the transformed media is not realistic, or does not contain a detectable watermark, the process returns to step 804, and the training is repeated. The process is repeated many times until the transformed candidate media data contains a detectable watermark and appears realistic. In some embodiments, this occurs when the watermark-detectability message 150 and the inconsistency message 148 have null values (no improvement to be made).

At step 816, realistic media data is generated that includes a detectable watermark. As described previously, based on the media trained, a variety of different types of media may be generated. Of course, when generating images, the system 100 is trained on images. For example, when generating images of dogs, the system 100 is trained on images of dogs.

The process proceeds to step 818, which detects the watermark in the realistic media data. By detecting the watermark, the system 100 knows that the realistic media data is synthetic, and not original. The process then comes to an end.

A person of skill in the art understands that illustrative embodiments provide a number of advantages. For example, the system may perform steganography in the spectrogram space as opposed to the audio domain; the system may use a generative-adversarial neural network to help make the watermark 'hidden'—as opposed to training the 'watermarked' signal to look like an 'unwatermarked' signal—the adversary is training the 'watermarked' signal to look like a signal coming from a target speaker while the Watermark machine learning trains the signal to contain the watermark; the 'watermarked' signal looks like a signal from the unwatermarked dataset, but also is in the voice of the target speaker.

Advantages include that the adversarial network penalizes any deviation from normal audio from the unwatermarked dataset, so that this system 116 can explicitly optimize for not producing audio that obviously contains a watermark (e.g., detectable by human). Explicitly optimizing for hiding the watermark is an improvement over traditional watermarking techniques, which require manual design in thinking through what features would not be noticeable by human ears. In contrast, illustrative embodiments do not require expertise about which features would be noticed by human ears, since noticeable features are already penalized by the adversary.

Another advantage is that the generator 140 which is trained to produce the watermark can easily be jointly trained to conduct an additional task simultaneously—e.g., in the guiding example we've used, perform voice conversion while also adding a watermark. The allows both the watermarking task and the additional task (voice conversion) to be conducted by the same neural network, which means that their functionalities are intertwined in the same network weights. Therefore, the two tasks cannot be easily separated from each other, as is done in normal programs (where the watermark function could simply be skipped in the code) and is almost impossible to reverse engineer. This can be done in other kinds of machine learning systems by intertwining their parameters in the same way (not just weights in neural networks).

In the speech data domain, watermarking could also be done with any audio processing implemented by a machine learning model, such as advanced denoising, speech enhancement, advanced autotuning by conditioning the model on the desired pitch, etc. This could also be done, for example, in the image space during style transfer or advanced filters implemented by machine learning models.

Further advantages of illustrative embodiments include that the watermark is embedded in the audio signal rather than being a separate easily removable component. The system trains the watermark machine learning 144 to verify if the watermark is contained in the audio, not to predict the watermark. This results in the watermark network 144 taking as input an audio signal and outputting a true/false signal.

Another advantage is that no expertise is needed in this system 116 to design a particular watermark that is robust to any particular transformation or set of transformations. This is an advantage over previous watermarking technologies, which required careful design by experts to produce a robust watermark. In this invention, the robust watermark is learned automatically by the generator 140 and watermark 144 systems, so that the only expertise which is needed is in choosing an appropriate set of transformations for the robustness module 120, which is a considerably simpler task.

Furthermore, illustrative embodiments may be integrated into identification systems (e.g., police and/or airport) and point of sale systems (e.g., registers at stores) for easy verification of identify. Thus, at point of sale systems, the triggered action may be that users pay with their voice, using a payment command (e.g., "pay $48.12"). Furthermore, illustrative embodiments may be incorporated into video in a similar manner described above.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Disclosed embodiments, or portions thereof, may be combined in ways not listed above and/or not explicitly claimed. In addition, embodiments disclosed herein may be suitably practiced, absent any element that is not specifically disclosed herein. Accordingly, the invention should not be viewed as being limited to the disclosed embodiments.

The embodiments of the invention described above are intended to be merely exemplary; numerous variations and modifications will be apparent to those skilled in the art. Such variations and modifications are intended to be within the scope of the present invention as defined by any of the appended claims.

What is claimed is:

1. A method of watermarking speech data, the method comprising:
    generating, using a generator, speech data including a watermark, wherein the generator is trained to generate speech data including the watermark, the training comprising:
        generating first speech data and/or second speech data from the generator, the first speech data and the second speech data each configured to represent speech, the first speech data and the second speech data each including a candidate watermark;
        producing an inconsistency message as a function of at least one difference between the first speech data and at least authentic speech data;
        transforming the first speech data and/or the second speech data, including the candidate watermark, using a watermark robustness module to produce transformed speech data including a transformed candidate watermark,
        the transformed speech data including a transformed candidate watermark; and
        producing a watermark-detectability message, using a watermark detection machine learning system, relating to one or more desirable watermark features of the transformed candidate watermark.

2. The method of claim 1, wherein the authentic speech data represents (1) a particular target speaker relative to a plurality of different speakers, or (2) human speech.

3. The method of claim 1, wherein the watermark robustness module transforms the speech data by performing a mathematical operation with data representing a background sound or passing the audio through a microphone.

4. The method of claim 1, wherein the inconsistency message is produced by a discriminative neural network, the first speech data is generated by a generative neural network, the watermark-detectability message is generated by a second discriminative neural network.

5. The method of watermarking speech data of claim 1, wherein the training further comprises:
    repeating one or more steps of:
        generating updated speech data configured to represent human speech as a function of the inconsistency message and the watermark-detectability message,
        producing an updated inconsistency message relating to at least one difference between the updated speech data and realistic human speech,
        transforming the updated speech data to produce an updated transformed candidate watermark,
        detecting the updated transformed candidate watermark using a watermark detection machine learning system, and
        producing a watermark-detectability message relating to the updated transformed candidate watermark,
    until (a) the updated speech data cannot be distinguished from authentic speech data by a discriminative neural network, and (b) the updated transformed candidate watermark is detectable.

6. The method of watermarking speech data of claim 1, further comprising: transforming the updated speech data to produce an updated transformed candidate watermark using a plurality of various different transformations.

7. The method of claim 1, wherein the training further comprises:
    generating second speech data configured to represent speech as a function of the inconsistency message and the watermark-detectability message.

8. The method of claim 7, further comprising:
    transforming the second speech data using the watermark robustness module to produce transformed second speech data; and
    producing a second watermark-detectability message, using the watermark detection machine learning system, the second watermark-detectability relating to one or more desirable watermark features of the transformed candidate watermark.

9. The method of claim 8, further comprising:
    repeating the steps of:
        generating speech data,
        transforming the speech data using the watermark robustness module to produce transformed speech data, and
        producing the watermark-detectability message,
    to produce a robust watermark, the robust watermark configured such that it is embedded in the speech data to produce watermarked speech data, the watermarked speech data configured to represent authentic speech and to include a detectable robust watermark when transformed by the watermark robustness module.

10. A system comprising:
    an adversarial neural network configured to train a generative neural network to generate synthetic speech in a target voice;
    a watermark network configured to train the generative neural network to generate the synthetic speech including a watermark that is detectable by the watermark network,
    the adversarial neural network further configured to train the generative neural network to generate the synthetic speech in a target voice, the synthetic speech including the watermark; and
    the generative neural network configured to generate the synthetic speech including the watermark in the target voice.

11. The system as defined by claim 10, wherein the synthetic speech in the target voice including the watermark cannot be detected as synthetic by the discriminative neural network, the discriminative neural network having access to speech data from a plurality of voices, the speech data being mapped in a vector space.

12. The system as defined by claim 10, wherein the generative neural network is paired to the watermark network, such that the watermark is configured to be detected by the watermark network that trained the generative neural network.

13. The system as defined by claim 10, further comprising a watermark robustness module configured to transform the speech data to produce transformed speech data, and
    producing an inconsistency message as a function of the transformed speech data.

14. A system for training machine learning to produce a speech watermark, the system comprising:
- a watermark robustness module configured to (1) receive first speech data that represents realistic speech, the first speech data generated by a generative machine learning system, and (2) transform the first speech data to produce transformed first speech data; and
- a watermark machine learning system configured to receive the transformed first speech data and produce a watermark-detectability message, the watermark-detectability message relating to one or more features of the transformed first speech data that are detectable by the watermark machine learning system.

15. The system of claim 14, further comprising:
a generative neural network configured to generate the first speech data that represents human speech.

16. The system of claim 14, further comprising:
a discriminative neural network configured to receive the first speech data and produce an inconsistency message relating to at least one difference between the first speech data and realistic human speech.

17. The system of claim 14, further comprising:
a vector space having a plurality of mapped human voices, the plurality of mapped voices being real human speech.

18. The system of claim 14, further comprising:
the watermark machine learning system configured to embed a watermark in received speech data to produce watermarked speech data, wherein the watermarked speech data represents realistic speech and to include a watermark detectable by the watermark machine learning system when the speech data is transformed by the watermark robustness module.

19. A computer program product for use on a computer system for training a system to generate a speech watermark, the computer program product comprising a tangible, non-transient computer usable medium having computer readable program code thereon, the computer readable program code comprising:
- code for generating, using a generator, speech data including a watermark, wherein the generator is trained to produce speech data including the watermark,
- code for training the generator comprising:
  - code for generating first speech data configured to represent human speech, the first speech data including a candidate watermark;
  - code for producing an inconsistency message relating to at least one difference between the first speech data and realistic human speech;
  - code for transforming the first speech data, including the candidate watermark using a watermark robustness module to produce transformed first speech data including a transformed candidate watermark,
  - the transformed first speech data (1) configured to be detectable as realistic speech, and (2) including a transformed candidate watermark configured to be detectable by a watermark machine learning system;
  - code for detecting the transformed candidate watermark, using a watermark detection machine learning system; and
  - code for producing a watermark-detectability message relating to the transformed candidate watermark.

20. The computer program product of claim 19, further comprising:
program code for generating second speech data configured to represent realistic human speech as a function of the inconsistency message and the watermark-detectability message, the second speech data configured to include a watermark and to represent realistic human speech.

* * * * *